April 12, 1966 W. R. TAYLOR, JR 3,245,433
WIRE BENDING MACHINE
Filed May 10, 1962 14 Sheets-Sheet 1
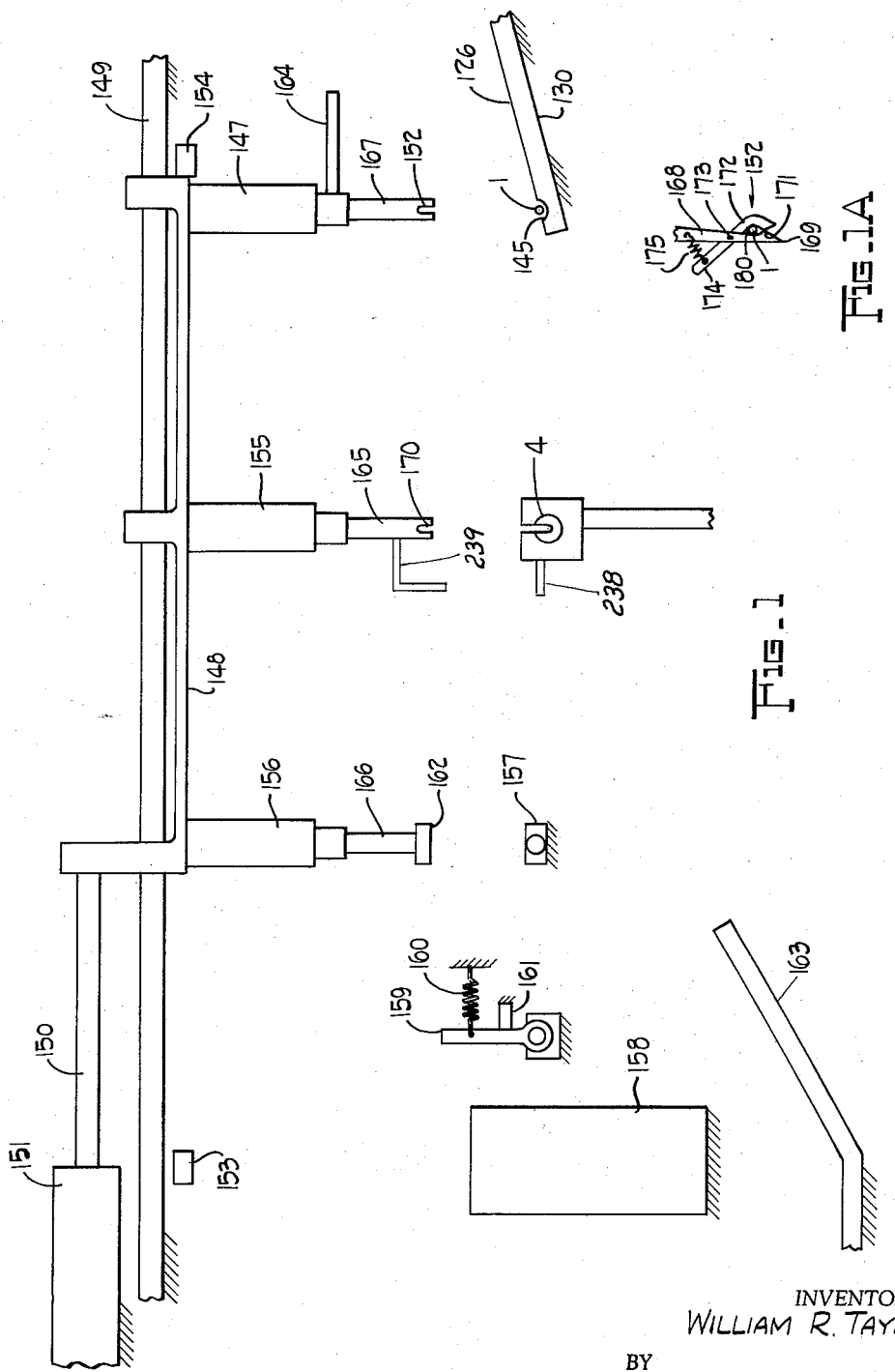
INVENTOR.
WILLIAM R. TAYLOR, JR
BY
Schramm, Kramer & Sturgeon
ATTORNEYS.

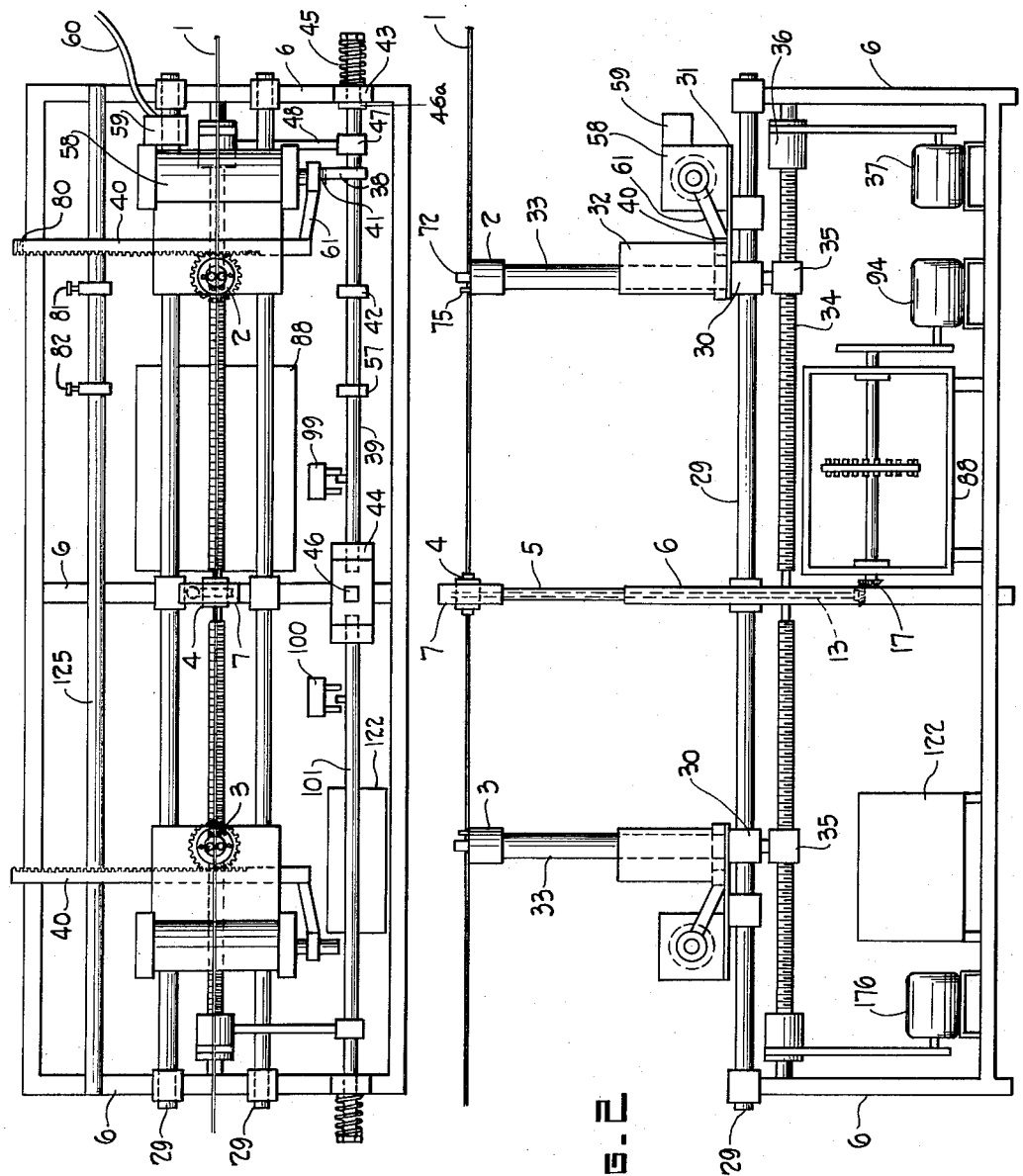

April 12, 1966

W. R. TAYLOR, JR 3,245,433

WIRE BENDING MACHINE

Filed May 10, 1962

INVENTOR.
WILLIAM R. TAYLOR, JR
BY
Schramm, Kramer & Sturgis
ATTORNEYS.

INVENTOR.
WILLIAM R. TAYLOR, JR.
BY
ATTORNEYS.

April 12, 1966 W. R. TAYLOR, JR 3,245,433
WIRE BENDING MACHINE
Filed May 10, 1962 14 Sheets-Sheet 5
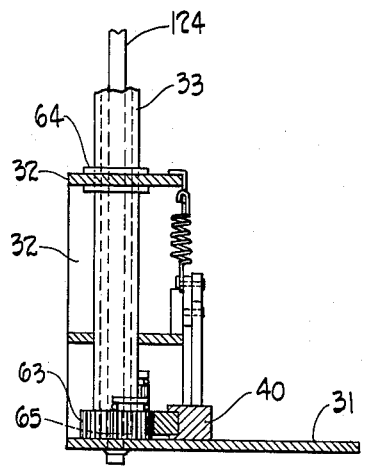
Fig.13
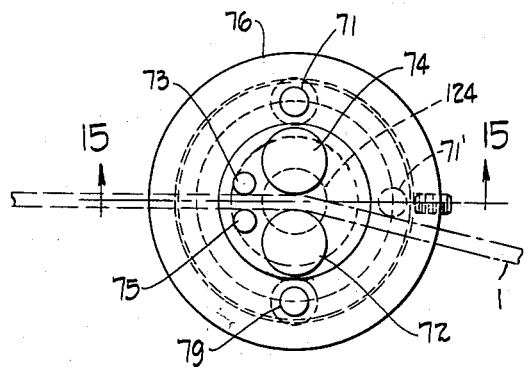
Fig.14
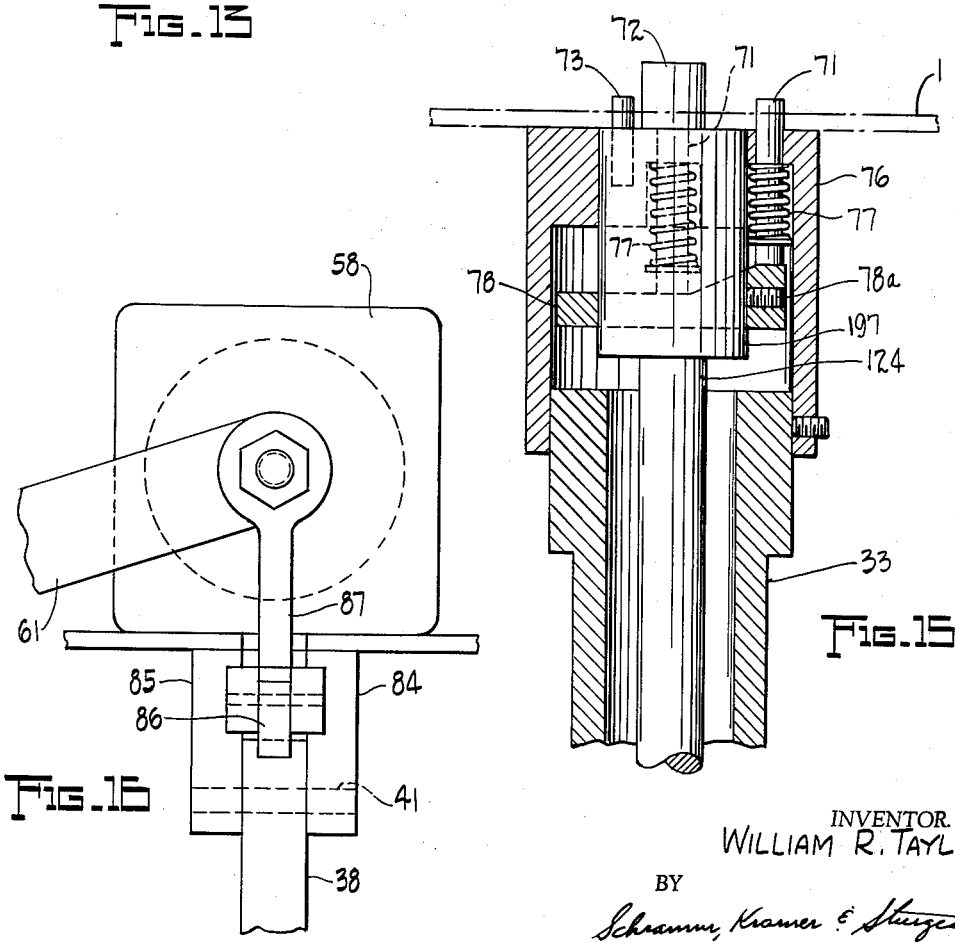
Fig.16
Fig.15
INVENTOR.
WILLIAM R. TAYLOR, Jr
BY
ATTORNEYS.

April 12, 1966 W. R. TAYLOR, JR 3,245,433
WIRE BENDING MACHINE
Filed May 10, 1962 14 Sheets-Sheet 6
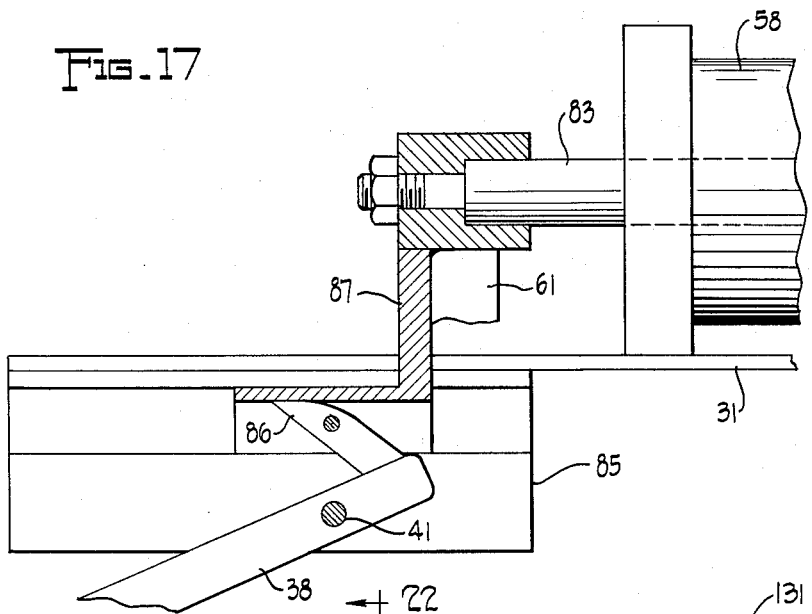
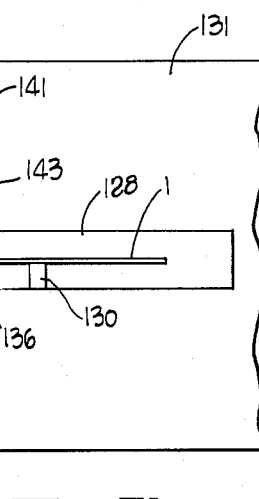
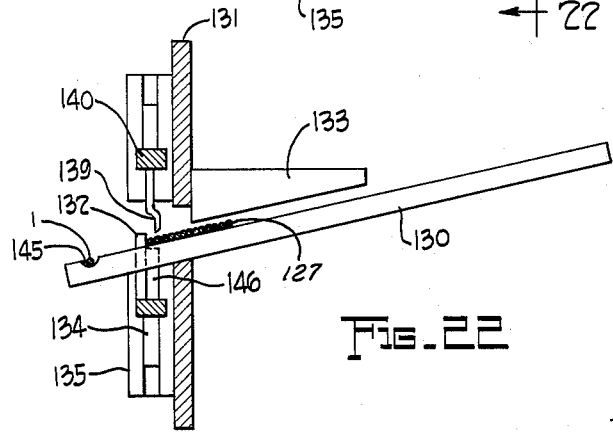
INVENTOR.
WILLIAM R. TAYLOR, JR.
BY
ATTORNEYS.

INVENTOR.
WILLIAM R. TAYLOR, JR.
BY
Schramm, Kramer & Sturges
ATTORNEYS.

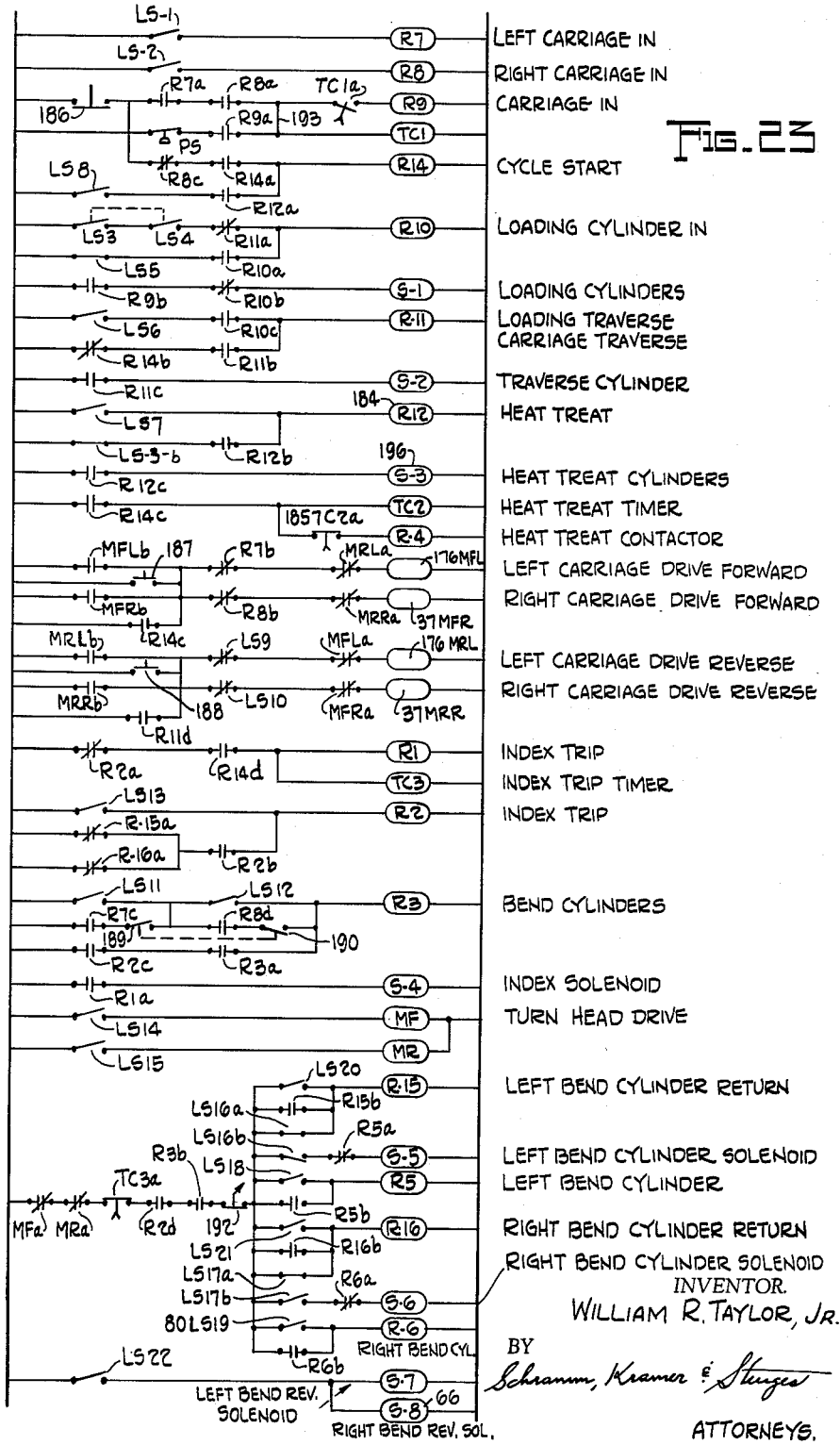

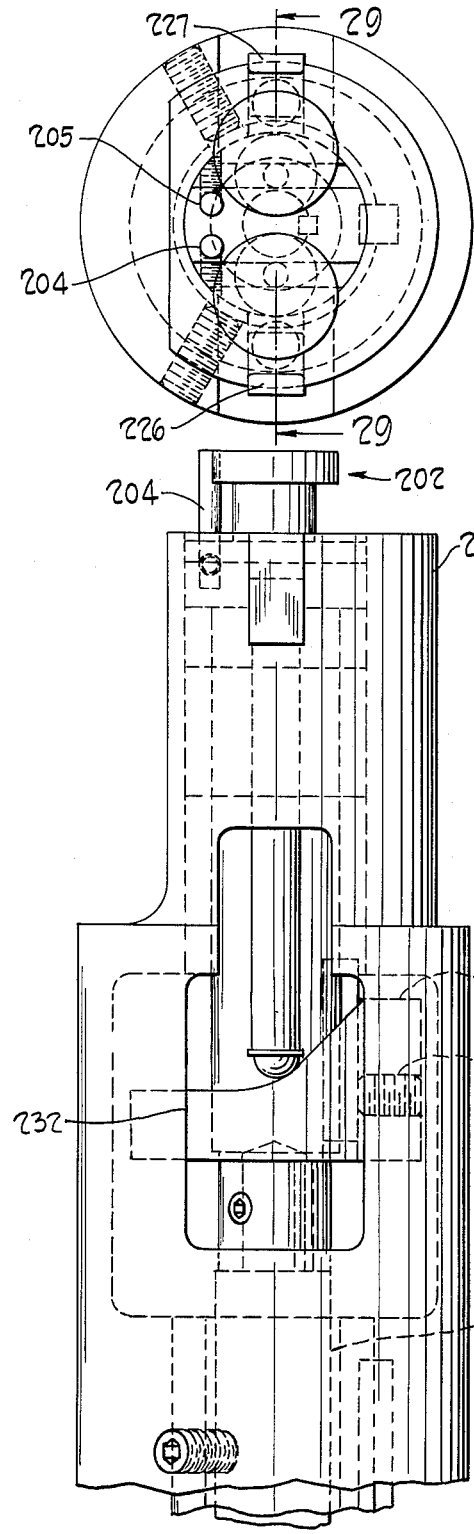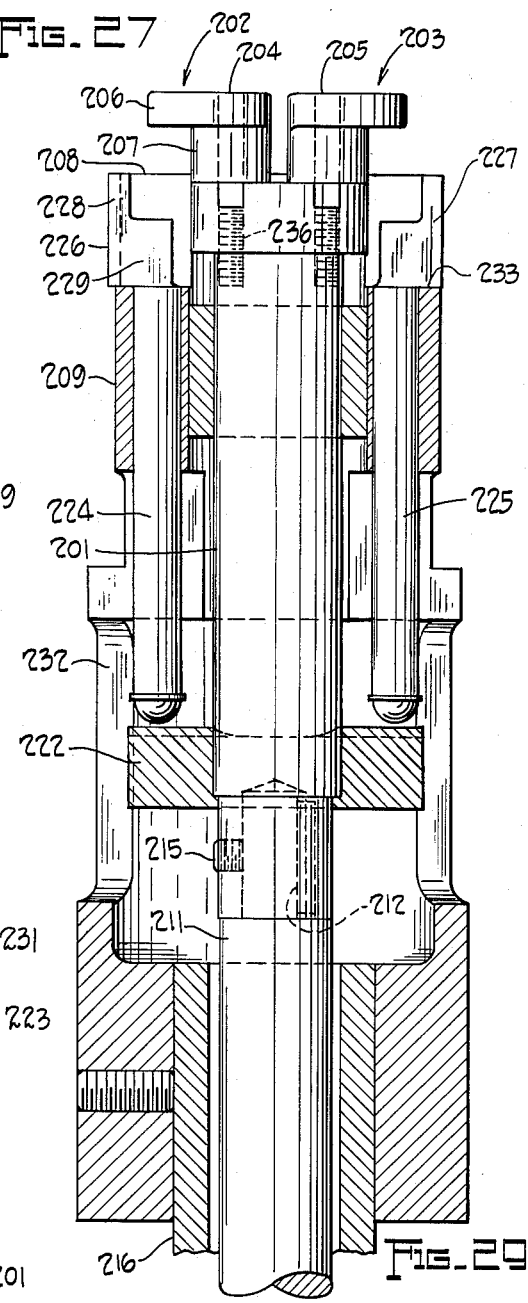

April 12, 1966 W. R. TAYLOR, JR 3,245,433
WIRE BENDING MACHINE
Filed May 10, 1962 14 Sheets-Sheet 11
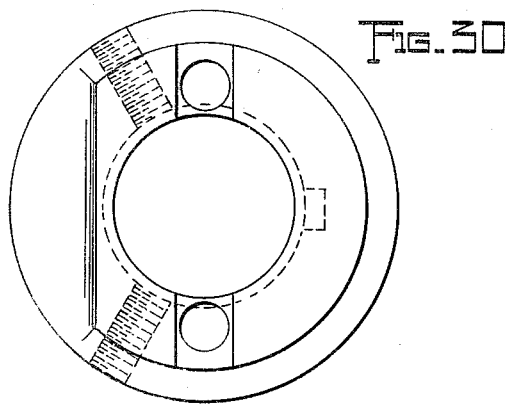
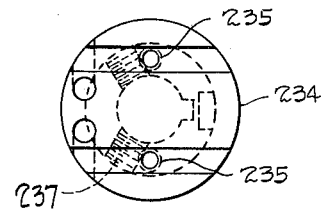
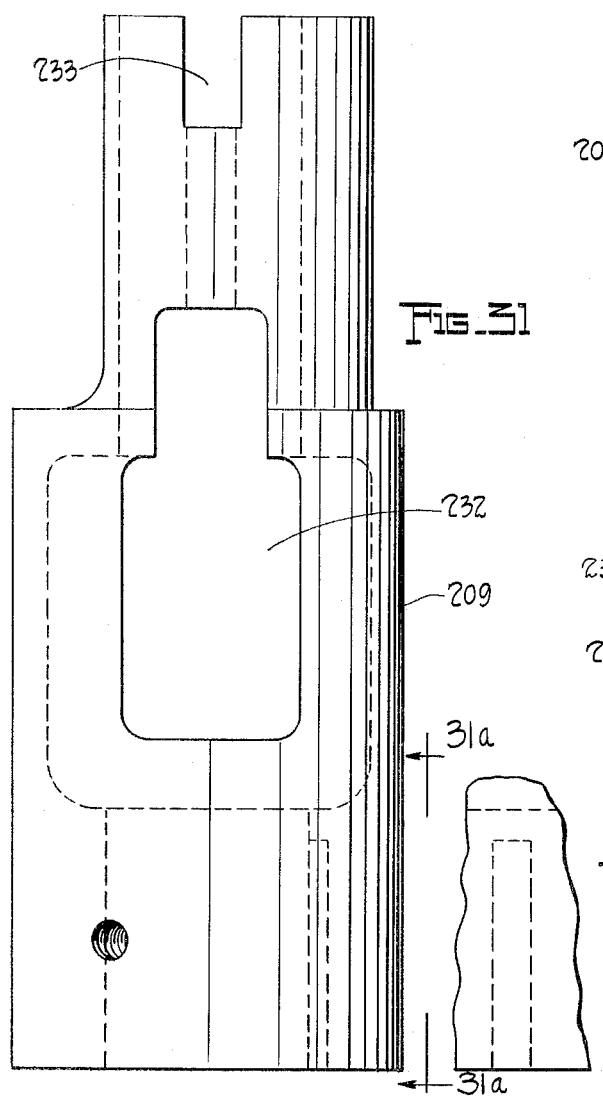
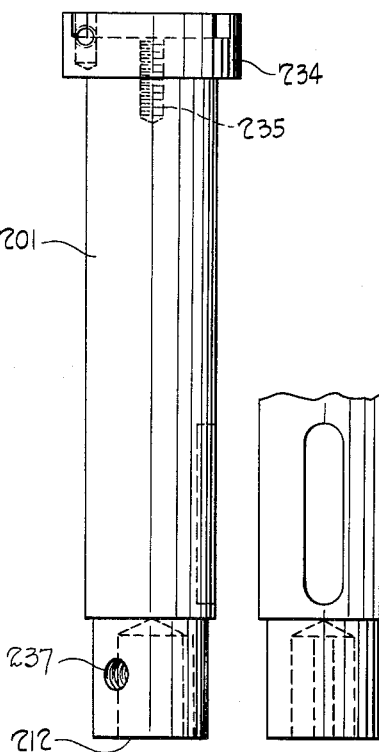
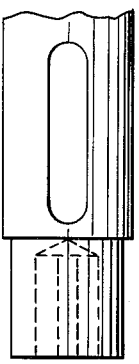
INVENTOR.
WILLIAM R. TAYLOR, JR
BY
ATTORNEYS.

April 12, 1966   W. R. TAYLOR, JR   3,245,433
WIRE BENDING MACHINE
Filed May 10, 1962   14 Sheets-Sheet 12
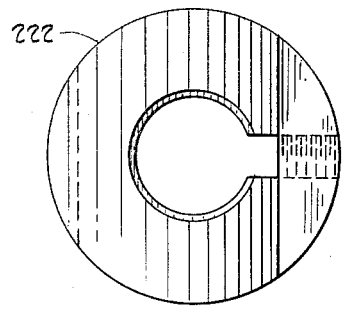
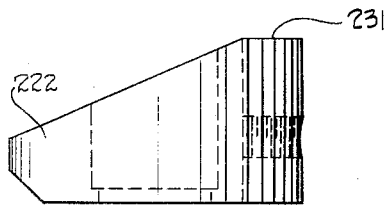
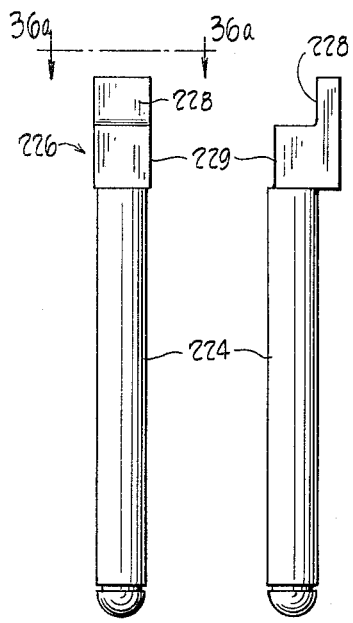
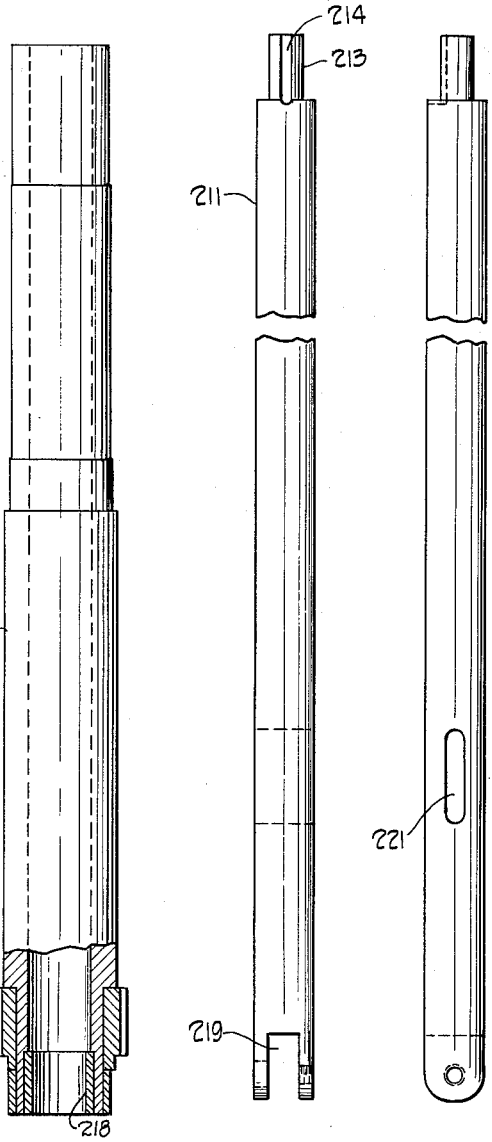
INVENTOR.
WILLIAM R. TAYLOR, JR.
BY
Schramm, Kramer & Sturges
ATTORNEYS.

April 12, 1966 W. R. TAYLOR, JR 3,245,433
WIRE BENDING MACHINE

Filed May 10, 1962 14 Sheets-Sheet 14

INVENTOR.
WILLIAM R. TAYLOR JR.
BY
Schramm, Kramer & Sturges
ATTORNEYS.

`3,245,433`
WIRE BENDING MACHINE
William R. Taylor, Jr., Cleveland Heights, Ohio, assignor, by mesne assignments, to Geometric Spring Company, Cleveland, Ohio, a corporation of Ohio
Filed May 10, 1962, Ser. No. 193,709
28 Claims. (Cl. 140—71)

This application relates to the production of wire springs and other bent wire forms.

An object of the invention is to enable wire pieces to be formed quickly and accurately with a plurality of bends, if desired, with different bends in different planes without at any time twisting the wire. A further object is to enable the formed wire pieces to be reproduced accurately.

Still another object of the invention is to form bent wire pieces automatically with precision and to accomplish heat treatment and dipping of the pieces automatically upon completion of the forming.

Still another object of the invention is to transfer cut lengths of wire stock from a hopper to a forming station, a heat treating station and a dip station automatically.

Another object of the invention is to index the position, angle of bend and plane of the bend in a formed wire piece having a plurality of bends. A further object of the invention is to adjust the angle of bend, location of bend, and plane of the angle of bend, each independently of the other adjustments.

Still another object is to form different bends with different radii.

Other and further objects, features and advantages of the invention will become apparent as the description proceeds.

In carrying out the invention in accordance with a preferred form thereof, a hopper is provided for lengths of wire stock, having a bed slanting downward toward a removal station, the bed having a blade or stop at the lower end for preventing the wire stock from rolling out of the hopper. Adjacent the hopper a wire bending machine is mounted and adjacent the bending machine a heat treat unit is provided beyond which there is a dip tank. A reciprocating carriage is provided having a plurality of pick-up elements so arranged as to pick up wire from the removal station of the hopper and transfer it successively to the wire bending machine, the heat treat unit and the dip tank.

The wire forming machine comprises a wire rotating head having a horizontal axis of rotation and a pair of bending heads on either side of the wire rotating head aligned with the axis of rotation of the wire rotating head. Each wire bending head has a supporting carriage moveable in a direction parallel to the axis of rotation of the wire rotating head and has an axis of rotation perpendicular to the axis of rotation of the wire rotating head. The wire bending heads include wire abutting members for engaging the wire when bending head is rotated to produce bends therein. Each bending head carriage has a pivoted latch extending transversely to co-operate with latch abutment members mounted in the path of the latch members when the carriage is moved. There are means responsive to engagement of the latch with one of the abutment members for interrupting the movement of the carriage, thereby setting the location of the next bend in the wire.

Programming mechanism or indexing mechanism is provided which includes first and second sets of indexing elements carried by an index member with means for producing progressive movement of the index member. There are latch means engageable and disengageable with the indexing elements and means responsive to completion of an actuation of the bending head for releasing the latching mechanism and permitting progress of the index carrying member an amount corresponding to the distance between indexing elements. One set of indexing elements is arranged for determining the angle of rotation of the plane in which the wire bending takes place. The second set of indexing elements of the programming mechanism is arranged for initiating action of the wire bending head. Indexing devices along the path of the bending head carriage are also provided for controlling the angle of bend produced. The bending head may be provided with a rising and falling stop member with different portions of different radius for enabling bends of different radius to be produced in the wire according to the position of the stop member.

A better understanding of the invention will be afforded by the following detailed description, considered in junction with the accompanying drawings, in which:

FIG. 1 is a schematic diagram of a wire spring forming apparatus constituting an embodiment of the invention;
FIG. 1a shows in greater detail a portion of FIG. 1;
FIG. 2 is a front elevation of a wire forming machine for use in the apparatus of FIG. 1;
FIG. 3 is a plan view of the apparatus of FIG. 2;
FIG. 4 is a front elevation of the wire holder and wire rotating head of the apparatus of FIGS. 2 and 3;
FIG. 5 is a right side elevation of the apparatus of FIG. 4;
FIG. 6 is a plan view of the wire gripper utilized in the rotating head of FIGS. 4 and 5;
FIG. 7 is a right-end view of the apparatus of FIG. 6;
FIG. 8 is a cross-sectional view of the apparatus of FIGS. 6 and 7;
FIG. 9 is a plan view of a portion of the apparatus of FIGS. 2 and 3, showing the mechanism for traversing carriages of wire bending heads with the operating clutch and linkage therefor;
FIG. 10 is a fragmentary view of a section of the apparatus of FIG. 9 as seen from the front;
FIG. 11 is a plan view, partially in section, of the carriage assembly for the wire bending head in the apparatus of FIGS. 2 and 3;
FIG. 12 is an elevation of the apparatus of FIG. 11 as seen looking from the left end of the apparatus of FIGS. 2 and 3;
FIG. 13 is a view of a section of the apparatus of FIG. 12 represented as cut by a plane 13 as seen from the front of the apparatus of FIGS. 2 and 3;
FIG. 14 is a plan view of the wire forming head or wire bending head of the apparatus of FIGS. 2 and 3;
FIG. 15 is a vertical section of the apparatus of FIG. 14;
FIG. 16 is a fragmentary view of a portion of the apparatus of FIGS. 2 and 3, illustrating the front view of a pivot latch release mechanism utilized in conjunction with the forming or bending head carriage clutch control mechanism of the apparatus;
FIG. 17 is a right elevation of the apparatus of FIG. 16, showing the apparatus partially in section;
FIG. 18 is a front elevation of programming mechanism utilized in the apparatus of FIGS. 1 and 2;
FIG. 19 is a sectional view representing in part a left side elevation of the interior of the mechanism of FIG. 18;
FIG. 20 is a view of a section representing in part a right side elevation of the interior of the mechanism of FIG. 18;
FIG. 21 is a front view of the wire hopper employed in the apparatus of FIG. 1;
FIG. 22 is a side elevation of the apparatus of FIG. 21, partially in section, and showing mechanism for releasing one wire at a time;
FIG. 23 is an "across the line" circuit diagram of the control mechanism employed in the apparatus of FIGS. 1 to 20;

FIG. 27 is a plan view of a modification of the apparatus of FIGS. 1 to 26, inclusive, for use in selectively bending wire on either a small radius or a large radius, thus representing a modification of the specific construction of the forming head of FIGS. 14 and 15;

FIG. 28 is a front elevation of the apparatus of FIG. 27;

FIG. 29 is a view of a section of the apparatus of FIGS. 27 and 28 as viewed from the side;

FIG. 30 is a plan view of the body of the forming head of FIGS. 27, 28 and 29;

FIG. 31 is an elevation of the structure of FIG. 30;

FIG. 31a is a fragmentary detail of the structure of FIG. 31;

FIG. 32 is a plan view of the radius forming member of the apparatus of FIGS. 27, 28 and 29;

FIG. 33 is an elevation of the apparatus of FIG. 32;

FIG. 33a is a fragmentary detail view of the lower side portion of the apparatus of FIG. 32;

FIG. 34 is a plan view of the cam mechanism employed in the apparatus of FIGS. 27, 28 and 29;

FIG. 35 is an elevation of the member of FIG. 34;

Figure 41:
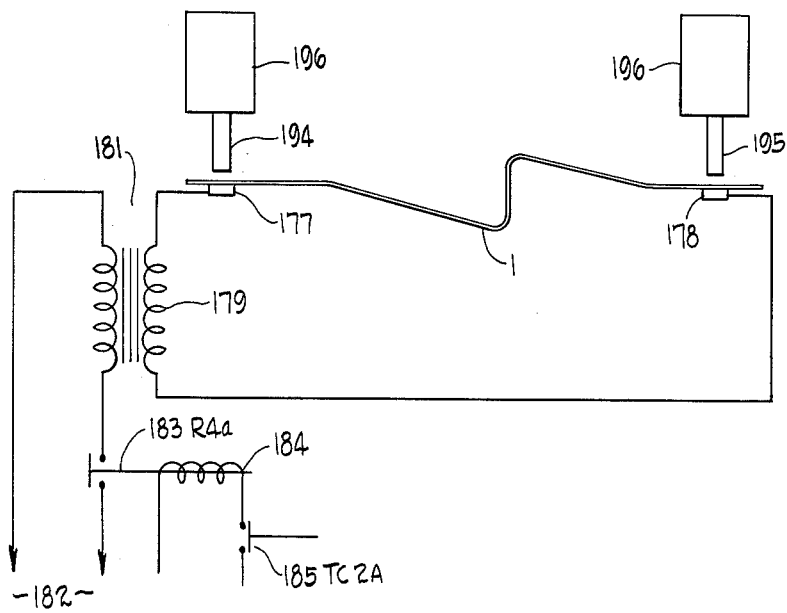
Figure 42:
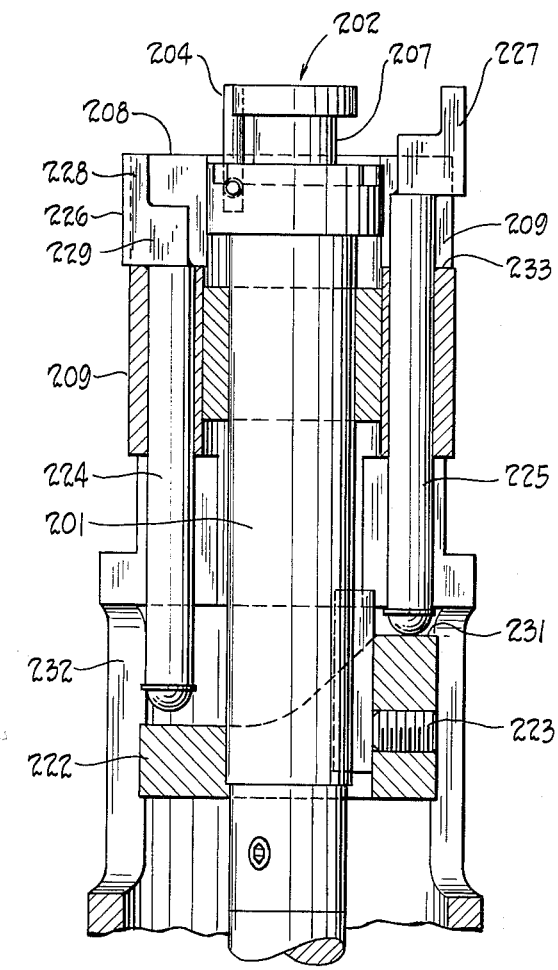

FIGS. 36 and 37 are front and side views in elevation, respectively, of rocking or lifting pins employed in conjunction with the cam member of FIGS. 34 and 35 for controlling the elevation of the radius forming member of FIGS. 32 and 33;

FIG. 36a is a top view of the pin of FIGS. 35 and 36;

FIG. 38 is an elevation of the turning sleeve of the apparatus of FIGS. 27, 28 and 29;

FIG. 39 is a front elevation of the central link member of the apparatus of FIGS. 27, 28 and 29 for controlling the selection of large or small radius bends; and FIG. 40 is a side elevation of the link of FIG. 39;

FIG. 41 is a circuit diagram of the heat treat mechanism and clamping arrangement; and FIG. 42 is a fragmentary view, partially in section, corresponding to FIG. 28 but showing the forming pin carrier rotated 90° to start engaging the wire being formed.

Like reference characters are utilized throughout the drawing to designate like parts.

For the sake of clarification, the coils and contacts of relays, actuators, contactors, and switch mechanisms are identified by including within the reference character the following symbols:

R—Relay coil
S—Solenoid of mechanical actuator or valve
TC—Coil of time delay contactor or relay
M—Coil of a motor starter
MFL—Forward control coil for lefthand forming head carriage motor
MFR—Forward control coil for righthand forming head carriage motor
MRL—Reverse control coil for lefthand forming head carriage motor.
MRR—Reverse control coil for righthand forming head carriage motor
MF—Control coil for forward direction of turning head motor
MR—Control coil for reverse direction of turning head motor
LS—Limit switch unit
PS—Pressure switch In the embodiment of the invention illustrated in the drawings, a wire forming machine is employed, the assembly of which is illustrated in FIGS. 2 and 3. A length of straightened wire 1 is shown in place in the machine. There are forming heads 2 and 3 in which the wire 1 rests and a wire rotating head 4 gripping the wire 1.

For supporting the wire rotating head 4, there is a vertical tube 5 rigidly attached to the machine frame 6. The tube 5 supports a bearing and worm housing 7 for the wire rotating head 4.

Figure 4:
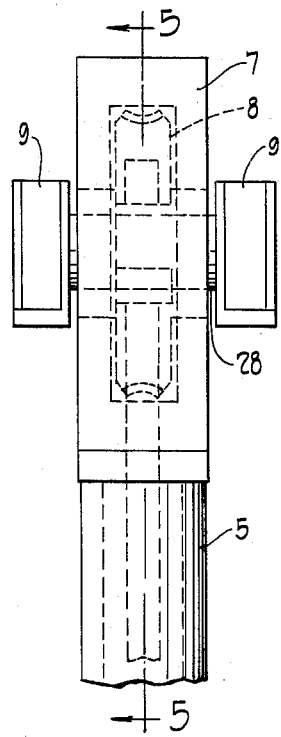
Figure 5:
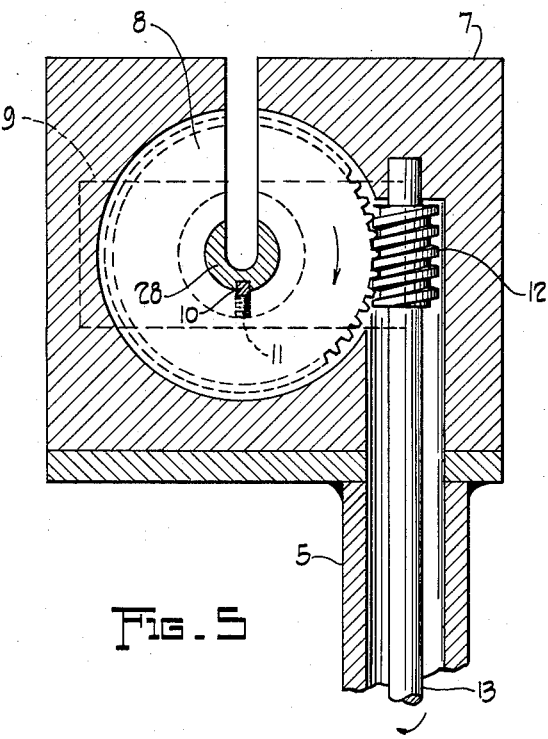

As shown in FIGS. 4 and 5, the wire rotating head 4 comprises a slotted worm gear 8 and two wire gripper assemblies 9 rigidly attached to the worm gear 8 by suitable means such as a key 10 and set screw 11. The gear 8 is machined to provide journals which are supported by the housing 7, which is split along the plane 5—5 indicated in FIG. 4 so that it can be assembled. The gear 8 is mounted so that it is rotatable about a horizontal axis, carrying with it the wire grippers 9. There is a worm 12 meshed with the gear 8 and having a driving shaft 13. As shown, the worm 12 is supported by the housing 7.

Figure 6:
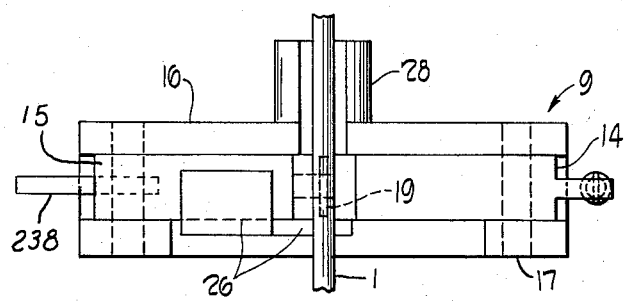
Figure 7:
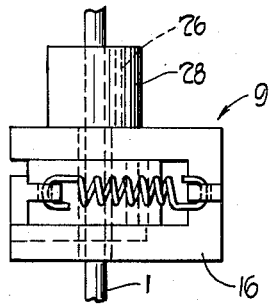
Figure 8:
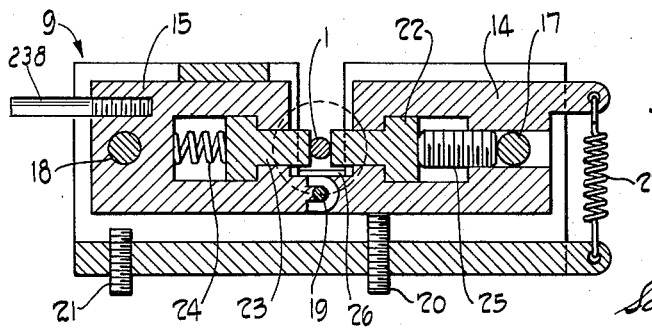

As illustrated in FIGS. 6, 7 and 8, the wire gripper 9 comprises two gripper bodies 14 and 15 which are held in a gripper housing 16 by means of pins 17 and 18. A pin 19 is provided for linking the gripper bodies 14 and 15 together at the center. The pin 19 is rigidly attached to the body 15 and slideable in a slot machined in the body 14. The arrangement is such that clockwise rotation of the body 14 will result in counter-clockwise rotation of the body 15 about the pins 17 and 18. For limiting the amount of rotation in either direction there are screws 20 and 21.

Slideably mounted in the gripper bodies 14 and 15 are hard, steel jaws 22 and 23. The faces of these jaws bearing on the wire 1 are serrated. A high rate or relatively stiff spring 24 is provided for forcing the jaw 23 to the right. A screw 25 is provided for positioning the jaw 22. There is a wire support 26 for positioning the wire 1 in the center of jaw faces. A tension spring 27 is provided for causing the gripper bodies 14 and 15 to rotate to their open position when there is no wire 1 in the gripper 9. A hollow stud or bushing 28 is integral with the gripper body 16 for connecting the gripper body 16 and the gripper unit 9 to the gear 8 by the key 10 and set screw 11 shown in FIG. 5.

When the wire 1 is loaded into the gripper 9 and pushed down it bears on the support 26. This causes both bodies 14 and 15 to rotate to their closed position as shown in FIG. 8. This position is slightly over-center downward as limited by the screw 20. In this position the wire is firmly gripped in steel jaws by the clamping force of the spring 24. Consequently, in this position the wire 1 is securely held on the horizontal axis of the gear 8 of FIGS. 4 and 5.

Bearing rods 29 are provided for slideably supporting platforms for the forming heads 2 and 3, each being independently movable toward or away from the wire rotating head 4 at the center of the machine. Both forming heads 2 and 3 are supported and controlled in the same manner and accordingly the structure will be described only in connection with forming head 2. For supporting the forming head 2 a carriage assembly is provided comprising bearings 30 attached to a platform plate 31 on which is mounted a housing 32. The carriage assembly rests on the bearing rods 29.

For driving the carriage assembly towards or away from the center of the machine along the bearing rods 29, a screw 34 is provided with a nut 35 in which the screw is engaged. The nut in turn is attached to the plate 31. A clutch 36 and a driving motor 37 are provided for driving the screw 34.

As shown in FIG. 3, the driving and control mechanism for the carriage assembly of the forming head 2 comprises a pivot latch 38, and a clutch bar 39, pivoted on an extension of the plate 31 by a pivot pin 41. The arrangement is such that the pivot latch 38 rests by gravity on the clutch bar 39. The clutch bar 39 is provided with a plurality of stops including a stop 42 adjustably attached to the bar 39. Bushings 43 and 44 are provided for supporting the bar 39 in such a manner that it can move horizontally. A compression spring 45 is provided for urging the clutch bar 39 in the outward direction and a stop 46 is provided for limiting the motion in the inward direction and a stop 46a for limiting motion in the outward direction. When the motor 37 is turned on, the carriage assembly moves toward the center of the machine until stopped by the engagement of the latch 38 with the stop 42.

Figure 9:
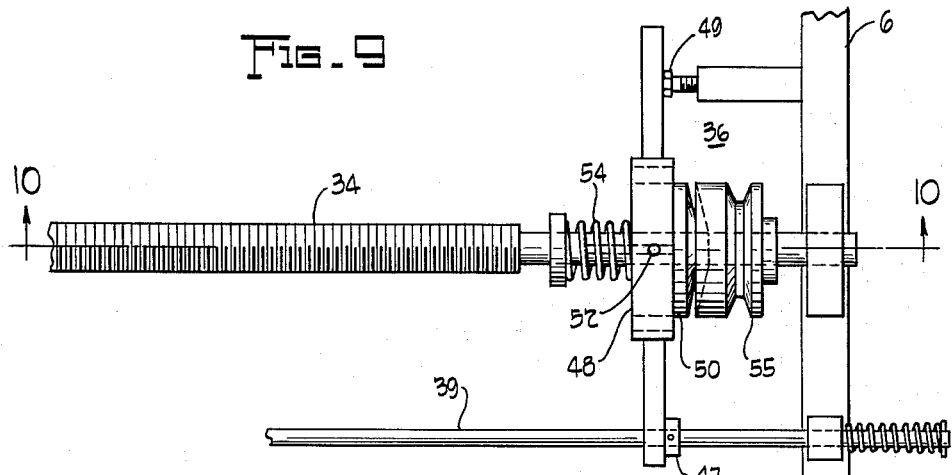
Figure 10:
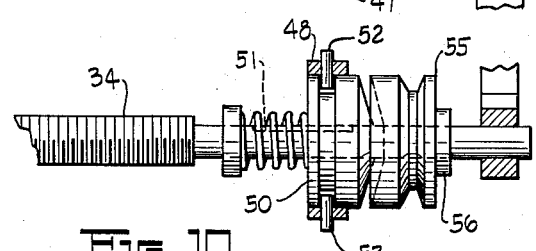

As shown in FIGS. 9 and 10, for stopping rotation of the screw 34 when the pivot latch 38 strikes one of the stops 42 on the clutch bar 39, a de-clutching assembly is provided comprising a stop 47 rigidly secured to the clutch bar 39, a clutch release yoke 48, an adjustable pivot abutment 49 for the clutch release yoke 48 in the form of an adjustable screw 49 supported by the machine frame 6, the clutch 36 having a driven member 50 keyed to the shaft end of the screw 34, the member 50 having an annular slot therein, and a pair of pins 52 and 53 carried in the yoke 48 adapted to engage the annular slot cut in the clutch driven member 50. The clutch driven member 50 is splined to the shaft end of the screw 34 by a key or spline 51, so that the member 50 is axially slideable therealong and a compression spring 54 is provided for resiliently urging the clutch driven member 50 axially toward the right. The key 51 thus enables the driven member 50 to transmit torque to the screw 34.

There is a pulley 55 serving as the clutch driving member having a stop in the form of a collar 56 secured to the shaft end of the screw 34 for limiting the outward axial movement of the clutch driving member and pulley 55. The pulley 55 is freely rotatable on the shaft end of the screw 34 so that when the clutch parts 50 and 55 are engaged the motor 37 rotates the screw 34. A plurality of other stops such as the stop 57 are provided on the clutch bar 39 according to the number of bends to be made in the wire 1.

As the carriage for the wire former or bending head 2 moves toward the center of the machine, when the pivot latch 38 strikes the stop 42, it moves the clutch bar 39 inward against the force of the compression spring 45 and causes the stop 47 to rotate the clutch release yoke 48 around the head of the screw 49 serving as a pivot for the clutch release yoke 48 so as to move the clutch driven member 50 away from the pulley and driving clutch member 55, thus disengaging the screw 34 and bringing it to a stop.

The carriage assembly then remains stopped until the latch 38 is lifted over the stop 42 allowing the clutch bar 39 to be returned to the right by the compression spring 45 and also allowing the compression spring 54 to move the driven clutch member 50 against the pulley 55 and again transmitting torque to the screw 34 from the motor 37. Thereupon, the carriage will again start to move toward the center of the machine until it is stopped in a new position by a second stop such as the stop 57, whereupon the same action takes place as before.

The arrangement is such that when both of the carriage assemblies are in a stopped position, either one or both will bend the wire 1 as a result of actuation of the forming heads 2 or 3. The mechanism for accomplishing this actuation in the case of the forming head 2 comprises a gear rack 40, an air-cylinder 58 (shown in FIGS. 2 and 3), an electric air-valve 59 in an air-line 60 for controlling admission of compressed air to the cylinder 58, a link 61 connecting the piston of the cylinder 58 to the gear rack 40, a gear 62 (shown in FIG. 11) engaging the gear rack 40, a gear 63 engaging the gear 62 connected to the rotatable sleeve or turning tube 33 of the bending head 2. Bearings 64 and 65 are provided in the housing 32 and the plate 31, respectively, for rotatably mounting the tube 33.

For enabling forward movement of the rack 40 to produce the opposite direction of rotation of the tube 33, a reversing mechanism is provided comprising a solenoid 66 arranged for lifting the gear 62 out of engagement with the rack 40 and the gear 63, and a pair of intermeshed gears 67 and 68 adapted to engage the rack 40 and the gear 63, respectively, a walking beam unit comprising a pivot pin 69 and a beam 70 pivoting around the stationary pivot 69 for causing one or the other of the two gears 62 and 67 to be lifted out of engagement with the rack 40.

When the carriage for the forming head 2 is in a stopped position, the wire 1 is bent by the action of the electric air-valve 59 allowing compressed air from the line 60 to enter the air-cylinder 58. The piston of the cylinder 58 in moving the gear rack 40 forward through the link 61 produces counter-clockwise rotation of the turning tube or sleeve 33. Forward motion is caused by the piston rod moving out of the air-cylinder 58. On the other hand, when the solenoid 66 is energized to raise the gear 62 and lower the gear 67 into engagement with the rack 40, forward motion of the rack 40 causes clockwise rotation of the turning tube 33.

Figure 11:
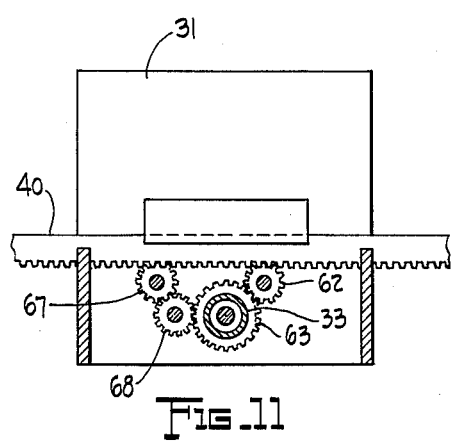
Figure 12:
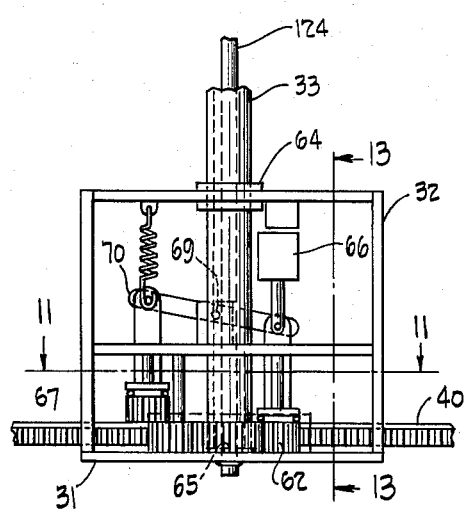

The turning tube and gear rack assembly is illustrated in FIGS. 11, 12 and 13.

As shown in greater detail in FIGS. 14 and 15, the forming head comprises together with the turning tube 33 a forming pin 71 (for producing clockwise bends in the wire 1), a radius pin 72 for use when clockwise bends are to be made in the wire 1, a backup pin 73, a second radius pin 74 for use when counter-clockwise bends are to be made in the wire 1, a second back-up pin 75, a forming pin carrier 76 secured to the upper end of the turning tube 33 in a suitable manner as by means of set screws, a compression spring 77 for urging the forming pin downward (the pin 71 being axially slideable in the forming pin carrier 76), and a forming pin lift cam 78 secured to an enlarged head 197 at the upper end of a stationary support rod 124. For enabling counter-clockwise bends to be produced, a second forming pin 79 is provided.

In FIGS. 14 and 15, the wire 1 is shown at the start of a clockwise bend. The wire 1 is placed between radius pins 72 and 74 and back-up pins 73 and 75. These pins are rigidly attached to the enlarged head of the stationary support rod 124 which in turn is secured to the plate 31. The forming pin 71 is urged downward by the action of the spring 77. Its downward motion, however, is limited by the forming pin lift cam 78 which is rigidly attached to the enlarged head of the support rod 124 by means of the set screw 78a. When the forming pin carrier 76 is rotated around the support rod 124 by the turning tube 33 the forming pin 71 is forced to climb the slope of the forming pin lift cam 78 causing the forming pin 71 to protrude above the top surface of the carrier 76 before it reaches the wire engaging position illustrated in FIG. 15 or the dotted position 71' illustrated in FIG. 14.

As rotation of the carrier 76 continues, the forming pin 71 is forced to bear against the wire 1 causing it to be bent around the radius pin 72. The standing part of the wire to the left of the radius pin 72 is maintained straight by the back-up pin 73. The forming pin 71 remains above the top surface of the carrier 76 as long as the clockwise rotation of the carrier 76 continues because friction between the forming pin 71 and the wire 1 overcomes the downward force of the spring 77. The wire 1 can thus be bent to any angle around the pin 72 until a complete U is formed. The angle is determined by the amount of rotation of the carrier 76. Counter-clockwise bending of the wire 1 is accomplished in the same manner by means of the forming pin 79 and the radius pin 74.

The mechanism for controlling the extent of the movement of the forming pin carrier and turning tube 33 and therefore the amount of bend of the wire comprises a switch 80 (FIG. 3) secured to the rack 40 for controlling actution of the electric air-valve 59 for the air-cylinder 58, and a plurality of rack stops 81 and 82 mounted adjustable in axial position upon a horizontal support rod 125 mounted upon the machine frame 6. The switch 80 is adjustably mounted upon the rack 40 so that it may be actuated upon striking one of the stops 81 or 82, and so forth, at a predetermined position of the rack 40 corresponding to a predetermined amount of bend of the wire 1.

The electrical connections of the switch 80 are such as to cause the air-valve 59 to reverse the flow of air to the cylinder 58 and cause the rack 40 to return to its normal position with the piston and piston rod fully returned into the cylinder. The adjustment of the switch 80 on the rack 40 is employed for increasing or decreasing the amount of bend at all stops due to variations in wire tensile strengths. Each of the rack stops, such as stops 81 and 82, may be individually adjusted. The positions of stops 81 and 82 along the rod 125 correspond to the positions of stops 42 and 57 on the clutch bar 39.

The mechanism for enabling the forming head 2 to progress toward the center of the machine after it has completed a bend in the wire and to commence successive bends at the proper position is illustrated in FIGS. 16 and 17 in conjunction with FIGS. 2 and 3. The carriage plate 31 supporting the forming head 2 and the air-cylinder 58 with its piston rod 83 is provided with plate extensions 84 and 85 which receive the pivot pin 41 for the pivot latch 38. A latch actuator 86 is provided which is pivotally mounted in a latch body 87 secured to the piston rod 83 of the cylinder 58. The latch body 87 is also rigidly attached to the link 61 which is attached both to the piston rod 83 and to the rack 40.

As the rack 40 is caused to return to its normal position by the action of the switch 80 the pivot latch 38 is lifted over the stop 42 allowing the carriage assembly to move toward the center of the machine to the next bend position as follows. When the piston rod 83 has nearly reached its normal position (fully retracted into the air-cylinder 58) the latch actuator 86 comes into contact with the upper end of the pivot latch 38 as illustrated in FIG. 17. Then as the latch actuator 86 moves further to the right the pivot latch 38 is forced to rotate clockwise around the pivot pin 41. This rotation raises the lower end of the pivot latch 38 to clear the stop 42 shown in FIG. 3 and allows the carriage assembly to move toward the center of the machine. However, as the latch actuator 86 moves further to the right it clears the end of the pivot latch 38 and the pivot latch 38 rotates counter-clockwise by gravity until it rests upon the bar 39 ready to engage the next stop on the bar such as the stop 57. The latch actuator 86 is pivoted in the latch body 87 in such a manner that movement of the latch actuator 86 to the left does not affect the position of the pivot latch 38.

Figure 18:
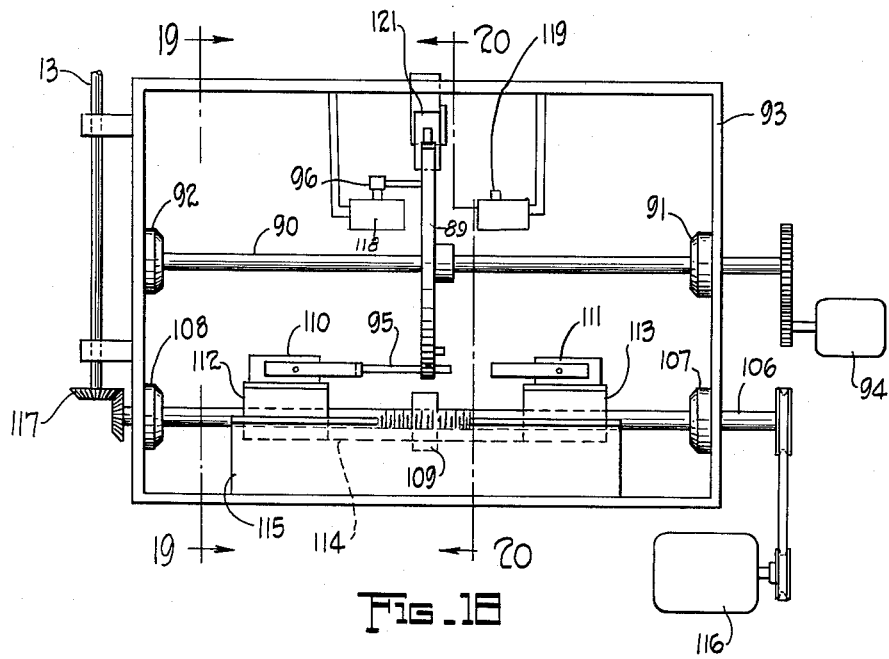
Figure 19:
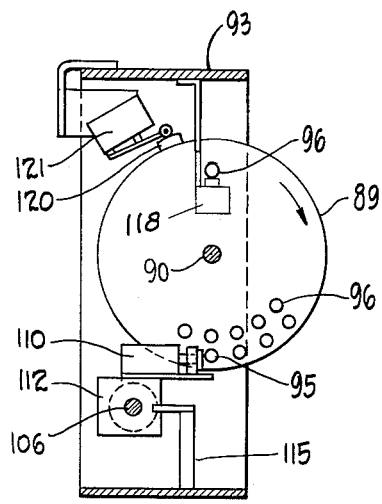
Figure 20:
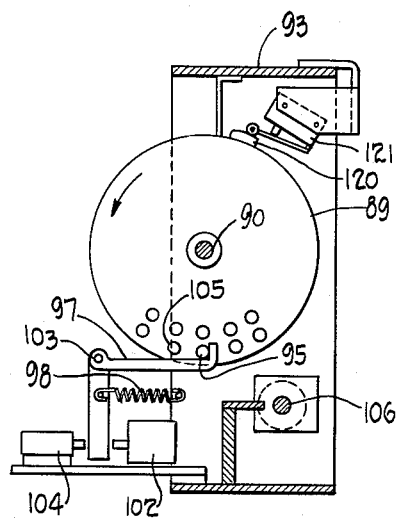

In order to enable the wire 1 to be formed automatically, a programming mechanism 88 is provided, shown at the base of the machine frame 6 in FIGS. 2 and 3. The internal construction is illustrated in FIGS. 18, 19 and 20. There is a program disk 89 with a supporting shaft 90 having bearings 91 and 92 rigidly attached to a programmer housing 93. There is a motor 94 for driving the shaft 90 through any suitable means such as gears. The motor 94 is a "torque" motor of the type which supplies constant torque to the program disk 89, but does not overheat when stalled.

The program disk 89 is drilled and tapped to receive a plurality of pins such as pins 95 and 96 in two concentric outer and inner rows, respectively. A bell-crank latch 97 is provided which has a biasing spring 98 causing the latch 97 to engage pins of the outer row 95 to prevent the program disk 89 from turning.

For controlling the latch 97 switches 99 and 100 are provided responsive to inward movement of clutch bars 39 and 101, respectively (the latter corresponding to the clutch bar 39, but for controlling the forming head 3), and there is a solenoid 102 for actuating the latch 97, which has a stationary pivot 103. A switch 104 is provided responsive to clockwise rotation of the bell crank latch 97 about the pivot 103. The switch 104 is a normally open switch which is actuated when the bell crank 97 is rotated counter-clockwise. The spacing between the pins in the outer row, for example, between pins 95 and 105 of the program disk 89 determines the angle of rotation of the disk 89 between successive indexing operations for successively setting the wire rotating head 4 and the wire formers 2 and 3 in operation.

The length of the pins such as the pins 95 and 105 in the outer row serves also to determine the angle through which the rotating head 4 turns at each index position. For accomplishing this a shaft 106 is mounted in bearings 107 and 108 in the index housing 93. The center portion of the shaft 106 is threaded righthand and a nut 109 is provided engaging the threaded portion of the shaft 106. Switches 110 and 111 are provided which are mounted on bearing blocks 112 and 113 which are bored to receive the shaft 106. A connecting bar 114 is provided which is attached to the nut 109 and the bearing blocks 112 and 113.

For preventing the nut 109 from rotating and keeping the bearing blocks 112 and 113 in an upright position, a key block 115 is provided which engages slots milled in the elements 109, 112 and 113. The key block 115 is rigidly attached to the programmer housing 93. A motor 116 is belted to the shaft 106 for driving it. The shaft 106 is interconnected to the vertical shaft 13 of the wire rotating head 4 by means of bevel gears 117.

A pair of switches 118 and 119 is provided which have actuating levers mounted in the paths of the inner row of pins 96 for producing the wire bending signals for forming heads 3 and 2, respectively. Interlocks (not shown in FIGS. 18, 19 and 20) are provided to prevent signals from switches 118 and 119 from being completed until the wire rotating head 4 has ceased to rotate.

Switch actuator pads 120 (FIGS. 19 and 20) are mounted on the peripheral surface of the program disk 89 and there is a co-operating switch 121 in an electrical circuit with the solenoid 66 for reversing the bending direction of the forming head 2, or correspondingly the direction of rotation of the forming head 3. For actuating the various motors, valves and solenoids, relays are preferably provided mounted in a control panel 122.

When the forming head carriages 2 and 3 of FIGS. 2 and 3 come to rest, the clutch bars 39 and 101 are forced inwardly to the left and to the right, respectively, closing switches 99 and 100, respectively. As hereinafter described, the solenoid 102 is thereby energized (FIG. 20) to rotate the bell crank latch 97 clockwise. This action releases the program disk 89 which starts to rotate. However, as soon as the latch 97 contacts switch 104 it opens the circuit through the solenoid 102 to de-energize the solenoid 102 and release the latch 97 which thereupon re-engages the next pin 105 and stops the program disk 89. In this way each time both carriages come to rest the program disk 89 indexes one space.

The assembly formed by the switches 110 and 111 and the nut 109 is moved either to the right or to the left along the shaft 106 as the shaft 106 is rotated clockwise or counter-clockwise by the reversible gear motor 116, simultaneously rotating the wire rotating head 4 through the bevel gears 117 and the shaft 13.

As shown in FIG. 18, when the pin 95 actuates the operating arm of the switch 110, a circuit is closed through the reversible gear motor 116 to turn the shaft 106 counter-clockwise (as seen in FIG. 20) causing the nut 109 and the switches 110 and 111 to move to the left along the shaft 106 (as seen in FIG. 18). This movement continues until the pin 95 no longer overlaps the operating lever of the switch 110 and therefore no longer actuates the switch 110, thus stopping the motor 116. This also stops the clockwise rotation of the wire rotating head 4 of FIGS. 2 and 3.

On the other hand, a pin actuating the switch 111 having such electrical connections as to produce reverse rotation of the motor 116 will turn the shaft 106 clockwise (as seen in FIG. 20) resulting in the nut 109 and switches 110 and 111 moving to the right along the shaft 106 and causing counter-clockwise rotation of the wire rotating head 4. The amount of rotation of the rotating head 4 thus depends on the length of the pins such as the pins 95 and 105 and the extent to which the pins project on either side of the program or indexing disk 89.

As shown, the switches 118 and 119 are so mounted as to avoid interference with the outer row of pins 95 and have operating levers responsive to engagement with pins of the inner row 96. If there is a pin in the inner row 96 projecting toward the operating lever of either switch 118 or 119 an electrical signal is produced to actuate one or the other or both of the bending heads 3 and 2. This occurs at any stopped position of the program disk 89.

If there is a pad 120 secured to the peripheral edge of the disk 89 for any corresponding angular position of one of the pins actuating the bending head, the reversing solenoid 66 is energized so as to actuate the reversing gear shift and reverse the bending direction of the forming head 2 or 3 as the case may be. The length of the pad 120 is sufficient so that the switch 121 is actuated as soon as the program disk starts to move to a new index position so that by the time the signal to bend is received the solenoid 66 will have completed shifting gears 62 and 67.

The mechanism for feeding the straightened and cut wire to the forming machine is illustrated in FIG. 1 and FIGS. 21 and 22. There is a hopper 126 shown fragmentarily in FIG. 1 for holding a plurality of pieces of stock in the form of straightened lengths of wire 127. To hold the stock 127 parallel and with successive pieces closely adjacent there is a sloping hopper bed consisting of support bars 130. It will be understood that the stock 127 is loaded onto the support bars 130 by the operator. A support plate 131 is provided and the support bars 130 are rigidly attached in a sloping position to the support plate 131. The latter in turn is rigidly attached to the machine frame 6 (FIGS. 2 and 3). The support plate 131 has a slot 128 cut therein horizontally long enough for the wire 1 to be formed to pass through the slot 128.

Stop blades 132 are provided for stopping the stock 127 and preventing its rolling down the support bars 130. An upper bar 133 is provided to prevent one wire from crossing over another. There is a support bar 134 to which the stop blades are rigidly attached, the support bar being vertically slideable in ways cut in brass bearing blocks 135. The brass bearing blocks 135 are rigidly attached to the support plate 131. Upper stops 136 are provided for limiting motion of the support bar 134 in its upward travel, the stops 136 also being rigidly attached to the support plate 131. For normally urging the support bar 134 upward compression springs 137 are provided which are supported by blocks 138 rigidly attached to the support plate 131.

In order to enable one piece of wire at a time to be separated from the stock 127, divider blades 139 are provided. The divider blades 139 are vertically movable and provided with a support bar vertically slideable by means of ways cut in brass bearing blocks 141. The brass bearing blocks 141 are rigidly attached to the support plate 131. For limiting the upward travel of the support bar 140, stops 142 are provided rigidly attached to the support plate 131; and for limiting the support bar 140 in its downward travel, stops 143 are provided rigidly attached to the support plate 131. For normally urging the support bar 140 upward, tension springs 144 are provided.

The support bars 130 are formed with arcuate notches 145 serving as a loading station. Push pins 146 are rigidly attached to the support bar 134 adapted to be contacted by the divider blades 139 when they move downward for lowering the stop blades 132.

For lifting the wire 1 from the loading station 145 there is an air-cylinder 147 (FIG. 1) rigidly attached to a transfer carriage 148 having support rods 149 upon which it is horizontally movable. For moving the transfer carriage 148 a cylinder rod 150 is provided co-operating with an air-cylinder 151 which is rigidly attached to the machine frame 6. A spring loaded fork 152 is provided on the end of the cylinder rod of the cylinder 147 for straddling a wire 1 in the loading station 145. The piston rod 167 is constructed to carry a pusher 164 adapted to engage the support bar 140.

A second cylinder 155 is provided for lifting a formed wire out of the wire rotating head 4 and transferring it to a heat treat station. A third cylinder 156 also carried by the transfer carriage 148 is provided for lifting the piece out of the heat treat station 157.

As shown, there are stops 153 and 154 for limiting the forward and backward motion of the carriage 148.

A finish tank 158 is provided which contains suitable coating material for the formed wire spring. In the embodiment illustrated, a latch 159, which is pivoted, is provided for stripping pieces from the heat treat pickup magnet. The latch 159 is so arranged as to be urged toward the right by a spring 160 against a stationary stop 161.

The cylinder 156 carries a magnet 162 adapted to carry the piece as it is lifted out of the heat treat station 157 and transfer it to the dip tank 158. A chute 163 is provided for receiving the finish pieces after being lifted out of the dip tank 158.

The transfer operation takes place as follows: When a previous length of wire 1 has been removed from the loading station 145, the remaining stock 127 rolls down the support bars 130 until stopped against the stop blades 132. Downward movement of the piston rod 167 and the pusher 164 causes the divider blades 139 to move downward, thus entering between the wire against the stop blades 132 and the wire next to it. As the divider blades 139 continue downward they contact push pins 146 which are rigidly attached to the support bar 134. As the support bar 134 is forced downward it lowers the stop blades 132 which disappear below the surface of the support rod 130 leaving the wire free to roll to the loading station 145. The other wires in the hopper are held back against the divider blade 139. After enough downward travel to release the wire to the loading station has occurred the downward force is removed and the tension and compression springs return the blades to their normal position. At this time the next wire rolls against the stop blades 132 and the cycle is ready to repeat.

When the air-cylinder 147 is actuated the cylinder rod 167 moves downward and the spring loaded fork 152 on the end of the rod straddles the wire 1 in the loading station 145. Retraction of the piston of the cylinder 147 to upward position lifts the wire which is retained in the fork 152.

The cylinder 151 is then actuated to move the piston rod 150 into the cylinder 151 moving the carriage 148 to its front position against the stop 153. The cylinder 147 is then directly over the rotating head 4. Thereupon actuation of the cylinder 147 moves the fork 152 downward placing the wire in the rotating head 4 and upon the pins of the forming heads 2 and 3. The wire is clamped in the rotating head 4 by reason of the action of the jaws previously described. Consequently, when the cylinder 147 is actuated in the opposite direction to retract its cylinder rod the wire 1 is left clamped in the forming position in the wire rotating head 4. The rod 150 then moves the wire pickup cylinders to the rear returning the carriage 148 to its rear position against the stop 154.

Simultaneously, the cylinders 155 and 156 are actuated up and down and operate in a similar manner. The piston rod 165 of the cylinder 155 serves to remove the formed part from the rotating head 4 and place it in the heat treat station 157. The magnet 162 on the cylinder rod of the cylinder 156 serves to remove the heat treated part from the heat treat station 157 and dip it in the finish tank 158 for applying wax or other desired coating or for quenching. In so doing the finished part passes over the latch 159 which allows the part to pass because it is freely rotatable counter-clockwise. However, when the cylinders 147, 155 and 156 are returned to the rear position of the cylinder 151 and the piston rod 150, the part which has been dipped strikes the latch 159 which cannot rotate in the opposite direction. Consequently, the finished part is stripped off the magnet 162 by the latch 159 and drops to the pan 163 where the operator receives it and places it in a shipping container.

The cylinders 147 and 155 and 156 contain pistons connected to piston rods 167, 165 and 166, respectively.

The spring loaded fork 152 such as attached to the piston rods 165 and 167 is shown in greater detail in FIG. 1a. Connected rigidly to the piston rod 165 is a shank 168 with a relatively pointed lower end 169 with a bulbous projection 171 co-operating with a tine 172 pivoted by means of a pin 173 to the shank 168 and having a projection 174 connected by a tension spring 175 to the shank 168 for biasing the tine 172 toward the bulbous lateral projection 171 of the point 169. The tine 172 is curved so as to form a pocket 180 for receiving the wire 1 when the spring loaded fork 152 is pressed downward adjacent to one of the support bars 130. Later when the piston rod 167 is in the forward position and the rod 150 is also in the forward position with the spring loaded fork 152 moving downward adjacent the wire rotating head 4 the clamping accomplished in the jaws of the wire rotating head 4 is sufficient to overcome the tension of the spring 175 when the hook or fork 152 is retracted upward.

Corresponding to the right-hand carriage motor 37 is a left-hand carriage motor 176 for driving the carriage of the forming head 3. Thus, bends may be formed in either or both ends of the wire 1 before it is transferred to the heat treat station.

The heat treat station 157, as shown in FIG. 41, comprises a pair of electrical terminals 177 and 178 adapted to receive the ends of a formed wire spring when lowered by the piston rod 165. The terminals 177 and 178 are connected to a suitable source of current supply such as the secondary winding 179 of a welding type transformer 181 connected in series with a source of alternating current 182 and a normally open contactor 183 having an actuating winding 184 connected in series with time delay contacts 185 arranged to re-open the circuit after a predetermined time duration according to the length of heating required to raise the wire 1 to the requisite temperature for accomplishing the heat treatment.

As shown in FIG. 23, automatic operation of the wire spring former is accomplished by certain electrical circuit elements including relays, contactors, air-valve solenoids, motor starter windings and the like.

Manual operation or jogging may also be accomplished by various manually operated switches.

For starting the automatic cycle there is a normally open off-on switch 186. For manually producing forward drive of the bender carriages there is a normally open push button switch 187 and for manually reversing the carriage drive there is a normally open push button switch 188.

For manually stopping the operation of the bending cylinders there are mechanically interlocked contactors, having normally open contacts 189 and normally closed contacts 190. A normally closed jogging switch 192 may also be provided for the interruption of operation of the bending cylinders.

Figure 24:
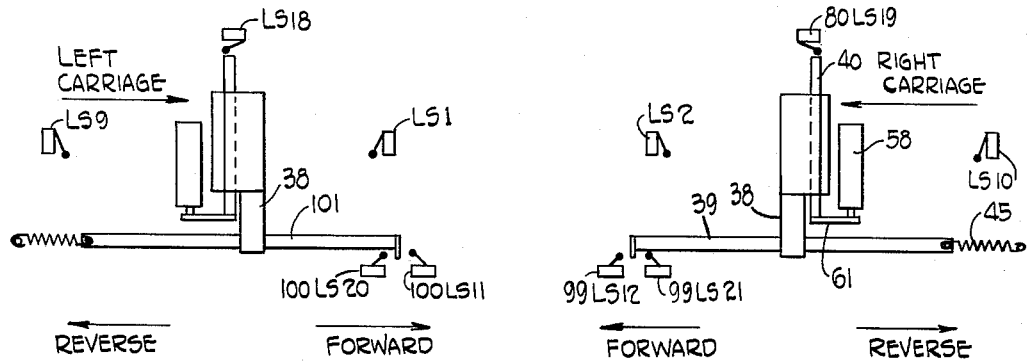
FIG. 24 is a schematic diagram representing in simplified form the apparatus of FIGS. 2 and 3 with the location of limit switches.
Figure 25:
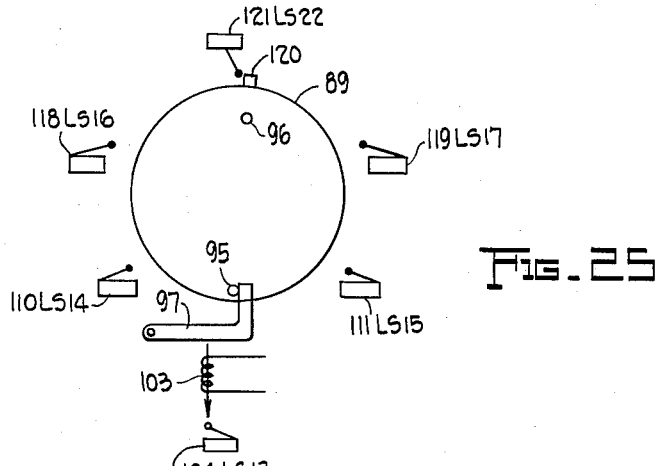
FIG. 25 is a schematic diagram of the programmer of FIGS. 18, 19 and 20 indicating the relative location of limit switches and indexing mechanism.
Figure 26:
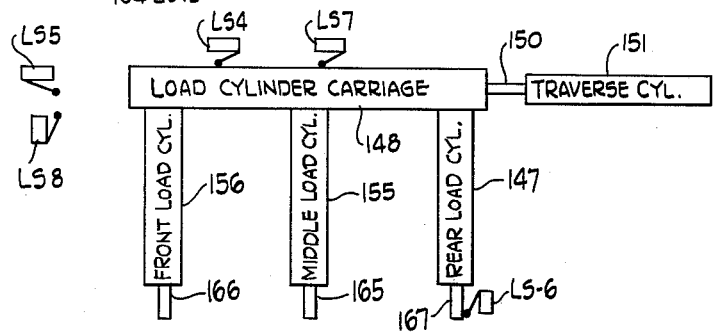
FIG. 26 is a schematic diagram of the load delivery and transfer mechanism for the apparatus of FIG. 1 and showing the relative location of limit switches represented in the circuit diagrams of FIGS. 21 and 22.

The location and function of the various limit switches employed in the automatic operation of the apparatus are illustrated schematically in FIGS. 24, 25 and 26.

Clamps 194 and 195 (FIG. 41) are provided for mechanically securing the ends of the piece 1 to the terminals 177 and 178 and assuring good electrical contact. The clamps 194 and 195 may be actuated in any suitable manner as by means of solenoid operated cylinders 196.

For achieving the automatic operation a plurailty of relays, contactors, limit switches, motor starters, pressure switch mechanism and the like are employed, including relays R–1 having a normally open contact R–1–$a$, R–2 having normally closed contact R–2–$a$ and normally open contact R–2–$b$, normally open contact R–2–$c$ and another normally open contact R–2–$d$. A relay R–3 having a normally open contact R–3–$a$ and a normally closed contact R–3–$b$, a heat treat contactor R–4 having a normally open contact R–4–$a$, relays R–5 with normally open contact R–5–$a$ and normally closed contact R–5–$b$, R–6 with normally closed contact R–6–$a$ and normally open contact R–6–$b$, R–7 with normally open contact R–7–$a$, normally closed contact R–7–$b$ and normally open contact R–7–$c$, R–8 with normally open contact R–8–$a$, normally closed contacts R–8–$b$ and R–8–$c$, and normally open contact R–8–$d$, R–9 with normally open contacts R–9–$a$ and R–9–$b$, R–10 with normally open contact R–10–$a$, normally closed contact R–10–$b$ and normally open contact R–10–$c$, R–11 with normally closed contact R–11–$a$ and normally open contacts R–11–$b$, R–11–$c$ and R–11–$d$, R–12 with normally open contacts R–12–$a$, R–12–$b$ and R–12–$c$, R–14 with normally open contact R–14–$a$, normally closed contact R–14–$b$, normally open contacts R–14–$c$, R–14–$d$ and R–14–$e$, R–15 with normally closed contact R–15–$a$ and normally open contact R–15–$b$, R–16 with normally closed contact R–16–$a$ and normally closed contact R–16–$b$.

There are solenoid valves for actuating cylinders of various kinds having solenoids including solenoid S–1 for controlling loading cylinders 147, 155 and 157, S–2 for controlling the traverse cylinder 151, S–3 for controlling heat treat clamp cylinder 196, index solenoid 102 S–4, left bend cylinder solenoid S–5, right bend cylinder solenoid 59 S–6, left bend reverse solenoid S–7, right bend reverse solenoid 66 S–8. There are time delay relays or contactors including a contactor or relay TC–1 having a normally open contact TC–1–$a$, a time delay relay TC–2 having normally closed contacts TC–2–$a$, and a time delay relay TC–3 having a normally closed contact TC–3–$a$. There is also a normally closed pressure switch PS.

There are limit switches as follows: normally open limit switch LS–1 responsive to the left carriage coming in, normally open limit switch LS–2 actuated when the right carriage comes in, mechanically connected limit switches LS–3 and LS–4 having a normally open contact LS–3–$a$, normally closed contact LS–3–$b$ and normally open contact LS–4–$a$, normally closed limit switch LS–5, normally open limit switches LS–6, LS–7 and LS–8, normally closed limit switches LS–9 and LS–10, normally open limit switches LS–11, LS–12, 104 LS–13, 110 LS–14 and 111 LS–15, limit switch 118 LS–16 having normally closed contacts LS–16–$a$ and normally open contacts LS–16–$b$, 119 LS–17 having normally closed contacts LS–17–$a$ and normally open contacts LS–17–$b$, normally open limit switch LS–18, normally open limit switches 80 LS–19, LS–20, LS–21 and 121 LS–22.

Separate starter windings are provided for driving the motors 176, 37 and 116 in opposite directions. These may take the form of interlocked three-pole contactors providing interchanged connections when these motors are three phase motors. When direct-current motors are employed, it will be understood that separate field windings may be employed for opposite directions or other suitable control circuits having separate windings for causing the motors to run in opposite directions when one or the other of the control windings is energized may be employed.

In the cross-the-line diagram of FIG. 23, only the starter or control windings of these motors are illustrated. For the right-hand bending head carriage driving motor 37, there is a forward starter winding MFR and a reverse starter winding MRR. The foregoing starter windings are also arranged to actuate auxiliary interlocking contacts as follows: For the left-hand motor 176 in conjunction with the forward starter winding MFL there are normally closed contacts MFL-a and normally open contacts MFL-b. For the reverse running starter winding MRL there are normally closed contacts MRL-a, normally open contacts MRL-b. Likewise, for the motor 176 starter windings there are normally closed contacts MFL-a and normally open contacts MFL-b and normally closed contacts MRL-a and normally open contacts MRL-b. For the index driving motor 116, for the counter-clockwise or forward running direction, there is a starter MF having normally closed auxiliary contacts MF-a and for the reverse or clockwise running of the motor 116 of the index disk 89 there is the starter winding MR having normally closed auxiliary contacts MR-a.

When the apparatus is set for automatic operation the following sequence of operation takes place:

(1) At the start of a cycle the left and right hand carriages for the wire formers or benders 3 and 2, respectively, are located at the ends of their forward travel in the center of the machine. The index disk 89 is rotated to a position in which no limit switches are actuated. The loading carriage 148 is then in its rear position, as illustrated in FIG. 1, with loading cylinder piston rods 165, 166 and 167 in the "up" position. In this position the left carriage is actuating limit switch LS-1 and the right carriage is actuating limit switch LS-2. These switches are normally open and are closed by the carriages having come into the center position. The closing of the limit switches LS-1 and LS-2 energizes the relay windings R-7 and R-8. Thereby the forward motion of the carriages has been stopped as a result of the opening of normally closed contacts R-7-b and R-8-b.

(2) To start the machine the automatic start switch 186 is turned to the "on" position. This energizes the thermal delay relay TC-1 through the now closed normally open contacts R-7-a and R-8-a and a conductor 193.

(3) The normally open contact TC-1-a energizes the relay R-9 after an adjustable time delay.

(4) The normally open contact R-9-a is thereby closed holding the relay R-9 in or energized through the normally closed pressure switch PS.

(5) The normally open contact R-9-d also closes energizing the loading cylinder solenoid S-1 to operate the loading cylinder air-valve.

(6) Consequently the loading cylinder piston rod 167 moves down, picks up a length of wire 1 from the loading station 145 and releases another wire from the hopper 126 into the loading station 145 and at the bottom of its stroke closes the normally open limit switches LS-3 and LS-4, the latter by the reaction or upward thrust of the cylinder.

(7) The closing of limit switches LS-3 and LS-4 energizes the relay R-10 through a normally closed contact R-11-a.

(8) The normally open contact R-10-a is thereby closed holding the relay R-10 in through the normally closed limit switch LS-5.

(9) The normally closed contact R-10-b is thereby opened de-energizing the loading cylinder solenoid S-1, causing the load cylinder rod 167 to return to its up position and closing the limit switch LS-6.

(10) The closing of the limit switch LS-6 energizes the relay R-11 through normally open contact R-10-c.

(11) The relay R-11 is held in through the normally closed contact R-14-b and normally open contact R-11-b.

(12) The normally open contact R-11-c energizes the traverse cylinder solenoid S-2 causing the rod 150 to move the loading cylinder carriage 148 to the front position, that is, to the left as seen in the view of FIG. 1. Likewise, a normally open contact R-11-d closes causing the right and left carriages to move in reverse by energizing the motor starters 176 MRL and 37 MRR. The carriages continue in reverse until they actuate the normally closed limit switches LS-9 and LS-10, at which time they stop and start forward as described below in paragraph 21.

(13) When the loading cylinder carriage 148 reaches the "front" position normally closed limit switch LS-5 is opened, de-energizing the relay R-10, causing normally closed contact R-10-b to energize the loading cylinder solenoid S-1. This operates the air-valve causing the loading cylinder rods 165, 166 and 167 to move down. All three of the loading cylinders are controlled by the same air-valve S-1. With the carriage in its rear position, the rear cylinder rod 167 moves down, picks up the piece of straight wire 1 and operates the hopper release to release the next wire at the loading station. The middle rod 165 moves down simultaneously and picks up the finished piece from the turning head 4. The front rod 166 moves down and picks up a finished piece from the heat treat station 157. With the carriage 148 traverse to the front position, the rear rod 167 places a straight wire into the turning head clamp 9, the middle rod 165 places the finished piece into the heat treat station 157, and the front rod 166 places the heat treated piece into the wax tank 158.

(14) When the loading cylinders reach the bottom of their stroke in the front position, the normally open limit switch LS-7 is closed energizing the relay R-12.

(15) The relay R-12 is held in through normally open contacts R-12-b and the normally closed limit switch contact LS-3-b.

(16) The normally open contact R-12-c energizes the heat treat cylinder solenoid S-3 causing the heat treat cylinders 196 to clamp.

(17) As pressure builds up in the heat treat cylinders, normally closed pressure switch PS opens de-energizing the relay winding R-9.

(18) The normally open contact R-9-b opens de-energizing the loading cylinder solenoid S-1 and returning the loading cylinder rods to the "up" front position.

(19) In this position the normally open limit switch LS-8 is closed, energizing the relay R-14 through normally open contact R-12-a.

(20) Normally open contact R-14-c closes, energizing heat treat timer TC-2 and heat treat contactor R-4 through normally closed contacts TC-2-a. After adjustable time delay the time delay relay TC-2 de-energizes the heat treat contactor.

(21) The normally open contact R-14-d closes, energizing the left and right forward carriage drive motor starters MFL and MFR. This causes the carriages to move forward to the first stop on the clutch bar release rod 39.

(22) The normally closed contacts R-14-b open, de-energizing the relay R-11 and thereby de-energizing the transverse cylinder solenoid S-2 causing the load cylinder carriage 148 to return to its rear position.

(23) Normally open contact R-14-e energizes the relay R-1 and the time delay relay TC-3 through the normally closed contacts R-2-a.

(24) The normally open contact R-1-a energizes the index trip solenoid S-4 allowing the index disk 89 to index to the next position. The index disk, it will be understood, is supplied with a constant low torque urging the wheel to rotate. The disk, however, is prevented from rotating by the latch 97 which engages pins such as pins 96 and 105 protruding from the surface of the disk 89. The latch 97 is released when the index trip solenoid S–4 is energized. The purpose of the disk 89 and pins is to operate the following limit switches. The limit switches 110 LS–14 and 111 LS–15 control the amount and direction of the wire turning head rotation. The limit switches 118 LS–16 and 119 LS–17 control the right and left bending heads 2 and 3. The limit switch 121 LS–22 controls the direction of bend of the right and left bending heads. The sequence description below will explain the operation of the circuit to produce a bend in the wire for the right bend head. As can be seen, the operation of the left bend head is the same except involving different switches and relays.

(25) The index trip solenoid S–4 at the end of its travel on being energized actuates the normally open limit switch 104 LS–13 to close it.

(26) The closing of the limit switch 104 LS–13 energizes the relay R–2 which is held in by normally closed contact R–15–a or R–16–a and normally open contact R–2–b.

(27) When the right and left carriages move forward to their first stops on clutch release rods 39 and 101 (see paragraph 21) the right-hand rod 39 closes the limit switch LS–12 and the left-hand rod closes the limit switch LS–11, energizing the relay R–3.

(28) The relay R–3 is held in through a normally open contact R–3–a and a normally open contact R–2–c.

(29) Index disk 89 demands a new angular position of the wire, either limit switch LS–14 or LS–15 will close energizing the turning head drive motor starter MF or MR, rotating the head until the limit switches open.

(30) At this point the right bend cylinder solenoid will be energized, assuming the following conditions are satisfied.

(a) Normally closed contacts MF–a and MR–a on starters MR and MF are closed indicating that the rotation of the wire is complete;

(b) Normally closed contact TC–3–a on TC–3 is closed indicating the delay relay TC–3 is timed out;

(c) Relay R–3 and relay R–2 are energized closing their normally open contacts R–2–d and R–3–b;

(d) The limit switch LS–17 is closed by the index disk 89.

(31) The right bend cylinder rod 83 will move forward until limit switch 80 LS–19 is closed.

(32) Thereupon, the relay R–6 is energized and held in by normally open contacts R–6–b.

(33) Normally closed contacts R–6–a open de-energizing the right bend cylinder solenoid S–6 and reversing the bend cylinder rod 83.

(34) At the end of the return stroke of the right cylinder the right clutch rod 39 is released and moves by the spring 45 to close the limit switch LS–21.

(35) The closing of the limit switch LS–21 energizes the relay R–16 which is held in by a normally open contact R–16–b.

(36) The normally closed contact R–16–a on relay R–16 opens, de-energizing the relay R–2. As can be seen, both relays R–16 and R–15 must be energized to de-energize the relay R–2. The relay R–15 is energized in this case, where no left hand is required, through the normally closed limit switch contact LS–16–a.

(37) When the relay R–2 is de-energized, the relay R–1 is energized through a normally closed contact R–2–a and through the normally open contact R–14–e. Thus, the bend cycle is started over again as in paragraph 24 above. Steps 24 through 37 repeat until all the bends on a given shape are completed and both the right and left carriages are at the end of their forward travel at which time they are in the position of paragraph 1 and the entire cycle starts over.

(38) When the limit switch 121 LS–22 is closed by the index disk 89 right and left bend reverse solenoids, such as the solenoid 66, are energized, causing right and left bend heads to reverse the direction of bend.

The spring 175 for holding shut the spring-loaded fork 152 is weak enough to release the wire 1 when the wire is gripped by the clamping jaws 22–23 of the wire rotating head 4. In order to enable the spring-loaded fork 170 to pick up the wire 1 from the rotating head 4 after the piece has been formed, a projecting release arm 238 is secured to the gripper body 15 and a trip arm 239 is secured to the piston rod 165 adapted to engage the release arm 238. The arrangement is such that when the fork 170 and the piston rod 165 descend in the position over the rotating head 4, the arm 239 strikes the arm 238 to rotate the gripper body 15 counter-clockwise. This lifts the jaws 22–23 above the dead center position so that the wire gripper 9 is tripped and releases the wire 1.

In FIGS. 14 and 15, details of construction are shown for a wire bending head for bending wire in either direction through a desired angle up to 180° around a predetermined radius, or an arrangement for producing bends of a predetermined radius. However, the invention is not limited to producing bends of a single radius and, if desired, radius pins may be employed having a plurality of different portions of different radius so as to bend the wire around a pin of any selected radius. For example, as illustrated in FIGS. 27 and 28, radius pins may be employed having two portions of different diameter so that either of two different radii may be selected for the radius of the wire bend, and as shown in FIGS. 30 to 40, mechanism may be provided for automatically selecting one or the other of the radii in response to indexing mechanism similar to that described in connection with the first embodiment of the invention.

The stationary vertical support rod 124 with its enlarged head 197 of FIGS. 14 and 15 carrying radius forming pins 72 and 74 and back-up pins 73 and 75 is replaced in the embodiment of FIGS. 27, 28, 29, 33, 39 and 40 by a vertical support rod 201 carrying a pair of radius pins 202 and 203. The support rod 201 also carries back-up pins 204 and 205. Each of the radius pins 202 and 203 has separate portions 206 and 207 of different radius. The upper portion 206 is of greater radius, but eccentric with respect to the lower portion 207 so that it overhangs outward with respect to the center of the support rod 201. Instead of being stationary, the support rod 201 is adapted to be caused to rise or fall without turning in order that the wire to be formed resting upon the upper edge 208 of the forming pin carrier 209 corresponding to the forming pin carrier 76 of FIG. 15 may be engaged by either the large radius upper portion 206 or the small radius portion 207 of the radius pins 202 or 203 on the vertical support rod 201 according to whether the rod 201 is in its lowered position or its raised position.

For ease in assembly, the vertical support rod 201 is jointed having a lower portion 211 to which it is removably connected by a suitable disengageable locking arrangement embodying a socket 212 at the lower end of the support rod 201 and a plug 213 at the upper end of the extension rod 211, the plug 213 having a groove 214 to receive a set screw 215. It will be understood that the vertical support rod extension 211 is shown at half scale in FIGS. 39 and 40.

In place of the turning tube 33 and forming pin carrier 76 of FIG. 15, in the 2-radius embodiment of FIGS. 28 to 40, there is a turning tube 216 carrying the forming pin carrier 209. In FIG. 38, the turning tube 216 is shown half scale to correspond to the half scale showing of the support rod extension 211.

The turning tube 216 carries a gear 217 corresponding to the gear 63 on the turning tube 33. However, the construction of the carriage base plate 31 of FIG. 13 is modified to provide a hollow inside bearing to receive a bronze bushing 218. The bearing for co-operating with the bushing 218 and supporting the lower end of the turning tube 216 is made hollow in order that the support rod extension 211 may extend downward below the carriage support plate 31 and co-operate with a cam operated walking beam or the like (not shown) engaging a pivot pin (not shown) adapted to be received in the forked lower end 219 of the vertical support rod extension 211. The mechanism for causing the vertical support rod 201 to rise or fall may consist of either cam operated walking beam or an air or hydraulic operated piston mechanism (not shown).

The support rod extension 211 is formed with a slot 221 extending through it laterally to receive a horizontal rod (not shown) mounted at the lower end of the forming head carriage to prevent the support rod extension 211 and the vertical support rod 201 from turning and also for limiting the upward and downward movement thereof in order that one portion 206 or the other portion 207 of the radius pins 202 and 203 will always be in position to form the radius of a length of wire 1 being bent.

Corresponding to the forming pin lift cam 78 of FIG. 15 in the embodiment of FIGS. 27 to 40, there is a forming pin lift cam 222 keyed and secured by a set screw 223 to the vertical support rod 201. However, since the vertical support rod 201 has two different vertical positions the forming pin lift cam 222 likewise has two different vertical positions according to the position of the vertical support rod 201. There are forming pins 224 and 225 riding upon the forming pin lift cam 222 and corresponding to the forming pins 79 and 71 of FIG. 14. However, the forming pins 224 and 225 are provided with specially shaped heads 226 and 227 which are eccentric with respect to the forming pins and have two different portions 228 and 229 offset different distances from the center line of the turning tube 216 and the forming pin actuator 209. As shown, the upper portion 228 of the forming pin head is offset sufficiently to clear the larger diameter portion 206 of the radius pin 202 or 203 when the forming pin 224 or 225 is riding on the high portion 231 of the cam 222 leaving sufficient space for a wire to be formed to pass around the larger diameter portion 206 of the radius rod while the forming pin is being revolved by the rotation of the turning tube 216 and the forming pin carrier 209. Likewise, the lower portion 229 of the head 226 or 227 is offset from the center of the turning tube sufficiently to clear the smaller diameter portion 207 of the radius pin 202 or 203 and permit the wire 1 to be carried around the radius pin. Since the forming pin lift cam 222 rises and falls with the vertical support rod 201 the uppermost or operative position of the forming pin 224 or 225, whichever is in use, conforms to the position of the radius pins for either large or small radius bends.

As shown in FIGS. 28 and 29, a window 232 is preferably provided in the forming pin carrier 209 for ease in assembling the vertical support rod 201 with its extension 211. It will be understood that suitable recesses 233 are provided in the upper portions of the forming pin carrier 209 to receive the heads 226 and 227 of the forming pins 224 and 225, respectively.

To facilitate assembly the vertical support rod 201 may be formed with a head 234 having threaded openings 235 to receive the radius pins 202 and 203, which are in the form of threaded members with shanks 236 receivable in the threaded openings 235 and have the specially shaped head with portions 206 and 207. Suitable means for securing the shanks 236 in the proper angular position may be provided such as lateral set screws 237.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What is claimed is:

1. Wire forming apparatus comprising in combination a wire rotating head having a horizontal axis of rotation, a pair of wire bending heads on either side of the wire rotating head aligned with the axis of rotation of the wire rotating head, each wire bending head having a supporting carriage movable in a direction parallel to the axis of rotation of the wire rotating head and having an axis of rotation perpendicular to the axis of rotation of the wire rotating head, said wire bending heads including wire abutting members for engaging the wire when the bending head is rotated to produce bends therein, each bending head carriage having a pivoted latch extending transversely, latch abutment members mounted in the path of the latch members when the carriage is moved, means responsive to engagement of the latch with one of the abutment members for interrupting the movement of the carriage, means for driving the carriages toward the wire rotating head, means responsive to interruption of motion of the carriage for actuating the wire bending head whereby the location of the latch abutments serves to control the positioning of bends in the wire being formed, programming mechanism including first and second sets of indexing elements carried by an index member and means for producing progressive movement of the index member, latch means engageable and disengageable with the indexing elements, means responsive to completion of an actuation of a bending head for releasing the latching mechanism and permitting progress of the index carrying member an amount corresponding to the distance between indexing elements, means for rotating the wire rotating head, means responsive to the first set of indexing elements for controlling the extent of rotation of the wire rotating head, means responsive to the second set of indexing elements for initiating actuation of the wire bending head.

2. Apparatus as in claim 1 wherein the extent of actuation of the wire bending head is controllable and each bending head carriage carries a member transversely movable with actuation of the bending head and indexing means are mounted along the path of said transversely movable members, the position of said indexing means serving to control the extent of actuation of the wire bending head, transverse positions at various points along the machine being selected for producing desired degrees of successive bends in the wire as the carriage moves toward the wire rotating head.

3. Apparatus as in claim 1 wherein the wire bending head includes a center post with two portions of different radii for selectively forming bends of different radius in a wire being bent and means are provided for lifting or lowering the radius forming member according to the radius desired and indexing means co-operating therewith are provided along the path of the radius member for lifting or lowering the latter according to the radius desired.

4. A wire rotating head comprising in combination a gear having a radial slot therein, the gear being adapted to be rotated, wire grippers comprising a pair of pivoted members having pivot points on a diameter of the gear and jaws extending inward, one of the jaws being movable inward approximately along a diameter of the gear and having relatively stiff spring means for urging the jaw inward, relatively weak spring means for urging the pivoted members to an open jaw position, stop means for limiting the pivotal movement of the pivoted members away from the open jaw position to the opposite position beyond center, the space between jaws of the gripper being aligned with the radial slot of the gear whereby a wire to be held may be pressed inwardly radially through said slot and into the space between said jaws transversely to the direction of the wire, movement of the wire in the inserting operation beyond the dead center position of the pivoted jaw members serving to grip the wire between the jaws.

5. Wire forming apparatus comprising in combination a wire rotating head having a horizontal axis of rotation, a wire bending head aligned with the axis of rotation of the wire rotating head, the wire bending head having a supporting carriage movable in a direction parallel to the axis of rotation of the wire rotating head and having an axis of rotation perpendicular to the axis of rotation of the wire rotating head, said wire bending head including wire abutting members for engaging the wire when the bending head is rotated to produce bends therein, said bending head carriage having a pivoted latch extending transversely, latch abutment members mounted in the path of the latch member when the carriage is moved, means responsive to engagement of the latch with one of the abutment members for interrupting the movement of the carriage, means for driving the carriage, means responsive to interruption of motion of the carriage for actuating the wire bending head whereby the location of the latch abutments serves to control the positioning of bends in the wire being formed, programming mechanism including a plurality of indexing elements carried by an index member and means for producing progressive movement of the index member, latch means engageable and disengageable with the indexing elements, means responsive to completion of an actuation of a bending head for releasing the latching mechanism and permitting progress of the index carrying member an amount corresponding to the distance between indexing elements, means for rotating the wire rotating head, and means responsive to the indexing elements for initiating actuation of the wire bending head.

6. Apparatus as in claim 5 wherein the extent of actuation of the wire bending head is controllable and each bending head carriage carries a member transversely movable with actuation of the bending head and indexing means are mounted along the path of said transversely movable members, the position of said indexing means serving to control the extent of actuation of the wire bending head, transverse positions at various points along the machine being selected for producing desired degrees of successive bends in the wire as the carriage moves toward the wire rotating head.

7. Apparatus as in claim 5 wherein the wire bending head includes a center post with two portions of different radii for selectively forming bends of different radius in a wire being bent and means are provided for lifting or lowering the radius forming member according to the radius desired.

8. A wire rotating head comprising in combination a gear having a radial slot therein, the gear being adapted to be rotated, wire grippers comprising a pair of pivoted members having pivot points on a diameter of the gear and jaws extending inward, one of the jaws being movable inward approximately along a diameter of the gear and having means for urging the jaw inward, means for urging the pivoted members to an open jaw position, stop means for limiting the pivotal movement of the pivoted members away from the open jaw position to the opposite position beyond center, the space between jaws of the gripper being aligned with the radial slot of the gear whereby a wire to be held may be pressed inwardly radially through said slot and into the space between said jaws transversely to the direction of the wire, movement of the wire in the inserting operation beyond the dead center position of the pivoted jaw members serving to grip the wire between the jaws.

9. A non-twisting wire bender comprising in combination a gripper for supporting a length of wire, the gripper being rotatable about the axis of the wire, a wire bender rotatable about an axis perpendicular to the axis of the wire and intersecting the axis of the wire, the wire bender being deflectible in a plane including the plane of the axis of the wire, means for deflecting the wire bender in said plane, means for advancing the wire bender toward the wire gripper for enabling successive bends to be made in successive portions of the wire, means for rotating the wire gripper around its rotation axis whereby different bends in the wire may be made in different planes whereby a wire structure may be formed with portions in different planes without twisting the wire.

10. A wire bending head comprising in combination a central member carrying a radius member against which a wire to be formed is adapted to be pressed, a second member rotatable about the center member having wire engaging means whereby rotation of the second member produces engagement of the wire and bending thereof around the radius member, the radius member being axially movable, having two portions of different radius and means for moving the radius member into either of two different axial positions for enabling selectively either of two different radii of bend to be obtained.

11. Apparatus as in claim 10 wherein the different radius portions of the radius member are eccentric, the larger radius portion having its center further displaced from the axis of the central member than the smaller radius portion.

12. A gripper for a wire rotating head comprising in combination a gripper housing, means for supporting the gripper housing rotatable about an axis of rotation, gripper bodies pivotally mounted within the housing having jaws extending toward the center of the housing on either side of the axis of rotation thereof, spring means for urging one jaw toward the other, spring means for pivoting the gripper bodies to open jaw position and stop means for limiting the pivoting in the opposite direction for locking the gripper bodies in the off-center position when a wire is placed between the jaws and pressed in the direction opposed to the open jaw position, whereby the spring force acting on the jaw holds a clamped wire in clamped condition.

13. Wire forming apparatus comprising in combination means for holding a length of wire, means for applying bending force successively to successive portions of the wire along the length thereof and means for selectively rotating the wire about its longitudinal axis during intervals between the application of bending force thereto.

14. In a wire former, a main frame, means on said main frame operable to grip and selectively rotate a length of straight wire about the axis thereof, a bending head engageable with said wire at a position spaced from said grip means, a carriage supporting said bending head for movement on said main frame between inner and outer positions, a motor for driving the carriage, a reversible control for the motor, limit switches at the inner and outer positions of the carriage and means responsive to actuation of the limit switches by movement of said carriage to said positions for actuating the motor controls for opposite directions of operation of the carriage driving motor.

15. In wire forming apparatus, a forming head, a carriage supporting the forming head, the carriage being movable between first and second positions, a rotatable drive shaft with means for engaging said carriage, a motor for rotating the drive shaft, a clutch interposed between the motor and the drive shaft, a clutch release bar extending parallel to the direction of motion of the carriage having abutments thereon, a latch mounted on a carriage adapted to engage said abutments as the carriage travels and means responsive to the latch for disengaging said clutch.

16. Apparatus as in claim 15 having means responsive to engagement of the latch with the clutch bar abutment for actuating the forming head.

17. Apparatus as in claim 16, having means responsive to actuation of the forming head for releasing the latch from a clutch bar abutment and causing advancing motion of the forming head carriage.

18. In wire forming apparatus a wire holder for holding wire in an axis, the wire holder being rotatable about said axis, a rotatable program disk having pins mounted thereon extending in a direction parallel to the axis of rotation of the disk, a limit switch carriage carrying a limit switch having an actuator adapted to engage the pins on the disk, a reversible motor for driving the carriage, a mechanical connection between the motor and the rotating head, the limit switch carriage being movable in a direction parallel to the axis of rotation of the program disk, whereby the forming head and the motor rotate so long as said pin and limit switch actuator are in engagement and rotation is stopped when the carriage has moved beyond the end of the pin on the program disk, whereby the length of the pin determines the extent of rotation of the wire rotating head.

19. Apparatus as in claim 18 wherein a forming head mounted on a movable carriage is provided to co-operate with the wire rotating head, the forming head carriage having a plurality of stations with stop means at each of said stations and means responsive to said stop means for advancing the programming mechanism for selectively setting the angular position of the wire for each station of the forming head.

20. Apparatus as in claim 19 with an interlock for disabling the forming head until completion of the rotation of the rotating head.

21. Wire forming apparatus comprising in combination a main frame, a wire rotating head on said frame having a horizontal axis of rotation, a wire bending head aligned with the axis of rotation of the wire rotating head and having an axis of rotation perpendicular to the axis of rotation of the wire rotating head, the wire bending head having a supporting carriage supported on said frame and movable in a direction parallel to the axis of rotation of the wire rotating head, said wire bending head including wire abutting members for engaging a wire held by said rotating head when the bending head is rotated to produce bends therein, said bending head carriage having actuating means thereon extending transversely of the direction of movement of said carriage, abutment members mounted on said frame in the path of said actuating means when the carriage is moved, means responsive to engagement of the actuating means with one of the abutment members for interrupting the movement of the carriage, means for driving the carriage, and means responsive to interruption of motion of the carriage for actuating the wire bending head whereby the location of said abutment members serves to control the positioning of bends in the wire being formed.

22. Wire forming apparatus comprising in combination a main frame, a wire rotating head having a horizontal axis of rotation, a wire gripping means on said head positioned for gripping a length of straight wire having its axis substantially coincident with said axis of rotation, a wire bending head aligned with the axis of rotation of the wire rotating head, the wire bending head having a supporting carriage movable on said frame in a direction parallel to the axis of rotation of the wire rotating head, and having an axis of rotation perpendicular to the axis of rotation of the wire rotating head, said wire bending head including abutting members positioned to engage a straight wire held in said gripping means, means for relatively moving said abutting members so as to bend a wire engaged therewith in a substantially horizontal plane, said bending head carriage having a pivoted member thereon extending transversely of the direction of movement of said carriage, abutment members adjustably mounted on said frame in the path of pivoted member when the carriage is moved, means responsive to engagement of the pivoted member with one of the abutment members for interrupting the movement of the carriage, means for driving the carriage toward said rotating head, and means responsive to interruption of motion of the carriage toward said rotating head for relatively moving the abutting members on said bending head whereby the location of said abutments determines the location of bends in the wire being formed.

23. Wire bending apparatus comprising a wire gripper head adapted to grip a straight portion of a wire to be bent, means for rotating said gripper head about an axis substantially coincident with the longitudinal axis of said straight wire portion, a bending head engageable with a portion of said wire spaced from said gripper head and disposed in a preselected plane coincident with said axis, said bending head including movable means for bending said engaged wire portion in said plane, and means providing for selective relative movement of said heads toward each other in a direction parallel to said axis for engagement of said bending head with other portions of said wire disposed in said plane for bending thereof by said bending head, whereby said gripper head is rotatable between successive operations of said bending head to provide for spaced portions of said wire being bent in relatively different planes.

24. Wire bending apparatus comprising a main frame, a wire gripper head mounted on said main frame and including means for gripping a straight portion of a wire to be bent, means for rotating said gripper head about an axis substantially coincident with the longitudinal axis of said straight wire portion, a bending head on said main frame engageable with a portion of said wire spaced from said gripper head and disposed in a preselected plane coincident with said axis, said bending head including movable means for bending said engaged wire portion in said plane, and drive means operable to move said bending head on said main frame toward said gripper head in a direction parallel to said axis for engagement of said bending head with other portions of said wire disposed in said plane for bending thereof by said bending head, whereby said gripper head is rotatable between successive operations of said bending head to provide for spaced portions of said wire being bent in relatively different planes.

25. Wire bending apparatus comprising a main frame, a pair of bending heads mounted on said main frame for generally horizontal movement toward and away from each other, each of said bending heads including wire bending means rotatable about a generally vertical axis for bending a wire in a substantially horizontal plane, a wire gripper head mounted on said main frame at a position between said bending heads for rotation about an axis disposed in said plane, said gripper head including means for holding a portion of a straight length of wire at a location in which the axis of said wire is substantially coincident with said axis of rotation of said gripper head, means for moving said bending heads toward said gripper head, stop means on said main frame defining stop positions of said bending heads, and means movable with said bending heads and engageable with said stop means for discontinuing movement of said bending heads toward said gripper head at positions of said bending heads corresponding to the positions of said stop means on said main frame.

26. Wire bending apparatus comprising a main frame, a pair of bending heads mounted on said main frame for generally horizontal movement toward and away from each other, each of said bending heads including wire bending means rotatable about a generally vertical axis for bending a wire in a substantially horizontal plane, a wire gripper head mounted on said main frame at a position between said bending heads for rotation about an axis disposed in said plane, said gripper head including means for holding a portion of a straight length of wire at a location in which the axis of said wire is substantially coincident with said axis of rotation of said gripper head, means for moving said bending heads toward said gripper head, stop means on said main frame defining stop positions of said bending heads, means movable with said bending heads and engageable with said stop means for discontinuing movement of said bending heads toward said gripper head at positions of said bending heads corresponding to the positions of said stop means on said main frame, and means for feeding a straight length of substantially horizontal wire to said gripper head.

27. Apparatus for bending a length of substantially straight wire having an axis disposed in a predetermined location, a wire gripper head disposed in gripping engagement with a portion of said wire, a wire bending head engaged with a portion of said wire spaced from said gripper head, said bending head including means movable about an axis substantially perpendicular to said wire axis for bending said engaged portion of said wire, means providing for selective relative movement of said heads toward each other in a direction parallel to said wire axis for engagement of said bending head with other portions of said wire for bending thereof by said bending head, and means operable to relatively rotate said heads with respect to said wire axis in between successive bending operations of said bending head to provide for bending of said wire in relatively different planes.

28. The method of forming nonplanar bent wire springs which comprises the steps of positioning a length of straight wire in a plane, mounting a portion of said length of straight wire for rotational non-translatory movement about an axis of said portion disposed in said plane, bending another portion of the wire spaced from said mounted portion within said plane, rotating the wire around its own axis within the plane, the bent portion thereof thereby being revolved around the axis of the unbent portion of the wire, and bending still another successive portion of the wire within the same plane as the wire was previously bent, whereby bending of the wire into different planes is accomplished without twisting of the wire.

References Cited by the Examiner

UNITED STATES PATENTS

| | | | |
|---|---|---|---|
| 1,216,711 | 2/1917 | Macklind | 241—1 |
| 2,752,956 | 7/1956 | Hampson | 140—71 |
| 2,868,237 | 1/1959 | Larkin | 140—71 |
| 2,868,268 | 1/1959 | Lewis et al. | |
| 2,869,591 | 1/1959 | Larkin | 140—71 |
| 2,902,076 | 9/1959 | Vitelli. | |
| 3,010,492 | 11/1961 | Ryder et al. | 140—104 |
| 3,045,740 | 7/1962 | Davis | 140—71 |
| 3,051,329 | 8/1962 | Bloom | 214—1 |
| 3,111,158 | 11/1963 | Wygant | 153—16 |

OTHER REFERENCES

"Tube Bending by the Numbers," American Machinist/ Metalworking Manufacturing; February 8, 1960, pp. 102–103; McGraw-Hill Pub. Co., New York.

CHARLES W. LANHAM, *Primary Examiner.*

KINGSLEY C. PECK, WILLIAM F. PURDY, MICHAEL V. BRINDISI, *Examiners.*